(12) United States Patent
Han

(10) Patent No.: US 7,034,100 B2
(45) Date of Patent: Apr. 25, 2006

(54) HETEROGENEOUS REACTION METHOD FOR PREPARING FUNCTIONALIZED POLYANILINES

(76) Inventor: Chien-Chung Han, Department of Chemistry, National Tsing Hua University (NTHU), Hsinchu (TW)

( * ) Notice: Subject to any disclaimer, the term of this patent is extended or adjusted under 35 U.S.C. 154(b) by 842 days.

(21) Appl. No.: 10/012,590

(22) Filed: Dec. 5, 2001

(65) Prior Publication Data

US 2002/0081275 A1     Jun. 27, 2002

Related U.S. Application Data

(63) Continuation of application No. 09/484,075, filed on Jan. 18, 2000, now Pat. No. 6,380,346.

(51) Int. Cl.
*C08G 65/38* (2006.01)
(52) U.S. Cl. .................. 528/210; 528/212; 528/214; 528/422
(58) Field of Classification Search ............. 528/210, 528/212, 214, 422

See application file for complete search history.

(56) References Cited

U.S. PATENT DOCUMENTS 5,346,649 A * 9/1994 Karna et al. ............. 252/500
5,489,400 A * 2/1996 Liu et al. ................. 252/500

* cited by examiner

*Primary Examiner*—Bernard Lipman
(74) *Attorney, Agent, or Firm*—W. Wayne Liauh

(57) ABSTRACT

The present invention is related to the functionalized polyanilines and also to a method for making said functionalized polyanilines. More particularly, a preferred embodiment of the method of the present invention comprises the steps of:

(a) providing polyaniline in a solid state form;
(b) subjecting the solid state polyaniline to a redox treatment to convert the backbone of the solid state polyaniline into a desirable oxidation state;
(c) subjecting the resultant polyaniline to a reaction treatment with a solution of reactive chemical reagent(s) in a selected solvent or solvent mixture for a period of time, where the solvent or solvent mixture is capable of dissolving or dispersing the chemical reagent(s), and swelling or wetting the solid state polyaniline, where the chemical reagent(s) is capable of functionalizing the solid state polyaniline and transforming the backbone of the solid state polyaniline into a more reduced form; and
(d) repeating steps (b) and/or (c);

wherein steps (b) and (c) can be reversed, or step (b) or step (c) can be omitted as desired in the first cycle or any subsequent repeat cycles of the redox/reaction treatments.

23 Claims, 4 Drawing Sheets

(I)

R₁SH      R₁R₂NH      R₁R₂PH (II)      (III)      (IV)

R₁SM      R₁R₂NM      R₁R₂PM (V)      (VI)      (VII)

(VIII)

(IX)

(X)

(XI)

(XII)

(XIII)

(XIV)

(XV)

(XVI)

(XVII)

(XVIII)

(XIX)

(XX)

HETEROGENEOUS REACTION METHOD FOR PREPARING FUNCTIONALIZED POLYANILINES

This application is a continuation application of U.S. patent application Ser. No. 09/484,075, filed Jan. 18, 2000, now U.S. Pat. No. 6,380,346, the content thereof is incorporated herein by reference.

FIELD OF THE INVENTION

The present invention generally relates to polyanilines, and more particularly to a heterogeneous reaction method for making functionalized polyanilines.

DESCRIPTION OF THE RELATED ART

Polyaniline, as a backbone conjugated conducting polymer, has various applications in the art. General applications of polyaniline and other conducting polymers are found in electronics, electrooptical devices, anti-corrosion, semiconductors, and microelectronics. Polyanilines, like other conducting polymers, are difficult to process due to their poor solubility in most common solvents. Substituted polyanilines with better solubility are highly desirable for those applications that require high solubility and/or high processibility. Conventional processes for preparing substituted polyaniline homopolymers or copolymers employ chemical or electrochemical oxidative polymerization methods directly from substituted aniline monomers. However, conventional processes for preparing substituted polyanilines have disadvantages. Unlike unsubstituted polyanilines that have highly conjugated 1,4-linkage backbone structures, the substituted polyaniline homopolymers or copolymers prepared from conventional processes often result in conjugation defects. The conjugation defects are due to the competing electronic influence from the substituents which lead to higher probability of forming the less conjugated 1,3-linkage backbone structure.

Another method for making functionalized polyanilines is the concurrent reduction and substitution reaction method (the CRSR method) using a homogeneous reaction. According to the homogeneous CRSR method, amino-substituted polyanilines are prepared by reacting dialkylamines with a homogeneous solution of unsubstituted polyaniline emeraldine base (i.e., with a solution state form of unsubstituted polyaniline emeraldine base) which contains about 25 mol % of diiminoquinoid ring units based on the polyaniline repeat units. The dialkylamines attack and then attach at the meta-position of the protonated quinoid ring, followed by a 1,3-proton shift of the meta-proton to the para-imine nitrogen, and a dialkylamino-substituted benzenoid ring is formed as a result. Unsubstituted diiminoquinoid ring repeat units are converted into dialkylamino-substituted diaminobenzenoid rings. The dialkylamino functional groups attach to the polyaniline backbones at the ortho- or meta-positions, and the most conjugated 1,4-linkage backbone structures of their parent polyanilines are therefore preserved. However, according to the homogeneous CRSR method the dialkylamines only attack the quinoid rings of the emeraldine base. As a result, the maximum amount of the substituent group that can be incorporated is limited to about 25 mol % of the polyaniline repeat units. The homogeneous CRSR method also has difficulties in effectively separating the resultant polyaniline from the chemical reagent solution, in purifying the resultant polyaniline, and in keeping the chemical reagent solution from being contaminated by the separation process. The homogeneous CRSR method also has a very limited selection of solvent media, due to the poor solubility of polyaniline in most solvents.

There is thus a general need in the art for an improved method for making functionalized polyanilines. In particular, a need exists in the art for preparing substituted polyanilines with a lower likelihood of conjugation defects. Furthermore, a method for making functionalized polyanilines that efficiently separate the resultant polyaniline and the chemical reagent solution, and overcome the above noted and other disadvantages in the art.

SUMMARY OF THE INVENTION

Part of the invention has been disclosed in the inventor's publication entitled '*Highly conductive new aniline copolymers containing butylthio substituent*', Macromolecules 2001, 34, p587–591, the content thereof is incorporated herein by reference.

The present invention relates to the doped and undoped forms of polyanilines, which comprise of substituted- and unsubstituted-aniline repeat units and have at least one functionalizing substituent on the polymer backbones. In particular, this invention is related to polyanilines comprising of the repeat units of Formula XV to XX of FIG. 4.

In the various embodiments of the present invention, the functionalized polyanilines of this invention comprise of the repeat units of the Formulas XV and XVI of FIG. 4 or a combination thereof, having various ratios of the above repeat units in the polyaniline backbone and presenting themselves as various oxidation state forms of polyanilines, such as leucoemeraldine, protoemeraldine, emeraldine, nigraniline and pernigraniline.

The more preferred functionalized polyanilines of the present invention are the polyanilines comprising of the repeat units of Formulas XVII to XX of FIG. 4, or a combination thereof.

The present invention is also related to a new and easy method for making said functionalized polyanilines. In particular, the present invention provides a feasible and effective method to carry out the concurrent reduction and substitution reaction method (the CRSR method) for solid state forms of polyanilines using a heterogeneous reaction. In addition to unsubstituted polyanilines, the method according to the invention can also be used for preparing substituted polyaniline homopolymers or copolymers. Numerous advantages are provided by the present invention over prior art methods using the homogeneous CRSR method, such as ease in separating the resultant polyanilines in their solid state forms from the chemical reagent solution, convenience in purifying the resultant polyanilines, ease in keeping the chemical reagent solution from contamination, which allows the reuse of the chemical reagent solution and offers a broader selection of solvent media. The present invention also allows the introduction of more than one type of substituents in a controlled sequential manner, thereby providing the polymer with multiple advantageous characteristics such as high solubility plus self-doping ability. The present invention also allows precise control of the degree of substitution (or derivatization) and the oxidation state of the resulting polyanilines, which enables optimal performance of subsequent applications such as anti-corrosion coatings, functional polyaniline electrodes, biosensors or chemical sensors. Furthermore, the method according to the present invention is advantageously less chemically consuming, more economical, and more environmentally friendly comparing with the homogeneous CRSR method.

More particularly, an embodiment of the method of the present invention comprises the steps of
  (a) providing polyaniline in a solid state form; and
  (b) subjecting the solid state polyaniline to a reaction treatment with a solution of reactive chemical reagent(s) in a selected solvent or solvent mixture for a period of time, the solvent or solvent mixture is capable of dissolving or dispersing the chemical reagent(s) and swelling or wetting the solid state polyaniline, and the chemical reagent(s) is capable of functionalizing the solid state polyaniline and transforming the backbone of the solid state polyaniline into a more reduced form.

Another embodiment of the method of this invention comprises the steps of:
  (a) providing polyaniline in a solid state form;
  (b) subjecting the solid state polyaniline to a redox treatment to convert the backbone of the solid state polyaniline into a desirable oxidation state;
  (c) subjecting the resultant polyaniline to a reaction treatment with a solution of reactive chemical reagent(s) in a selected solvent or solvent mixture for a period of time, where the solvent or solvent mixture is capable of dissolving or dispersing the chemical reagent(s), and swelling or wetting the solid state polyaniline, where the chemical reagent(s) is capable of functionalizing the solid state polyaniline and transforming the backbone of the solid state polyaniline into a more reduced form; and
  (d) repeating steps (b) and/or (c);

wherein steps (b) and (c) can be reversed, or step (b) or step (c) can be omitted as desired in the first cycle or any subsequent repeat cycles of the redox/reaction treatments.

BRIEF DESCRIPTION OF THE DRAWINGS

Other features and advantages of the present invention will be apparent from the following detailed description when read in conjunction with the accompanying drawings, in which like reference designations represent like features throughout the enumerated Figures. The drawings are not drawn to scale, unless specifically noted as such, the emphasis being placed on illustrating the principles of the present invention. In the accompanying drawings.

DETAILED DESCRIPTION OF THE PREFERRED EMBODIMENTS

Reference is now made in detail to an embodiment of the invention that illustrates the best mode presently contemplated by the inventor(s) for practicing the invention. Other embodiments are also described herein.

The polyanilines of this invention comprise of the substituted- or unsubstituted-aniline repeat units and have at least one functionalizing substituent on the polymer backbones. In particular, this invention is related to the polyanilines comprising of the repeat units of Formula XV to XX of FIG. 4, or a combination thereof.

Figure 4:
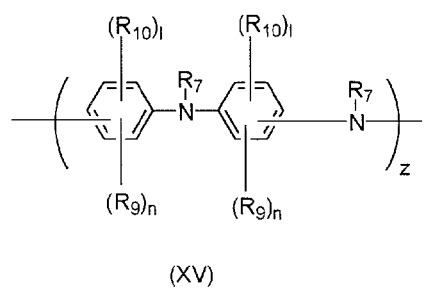
FIG. 4 is a diagram illustrating the functionalized polyanilines of the present invention.
Figure 4:
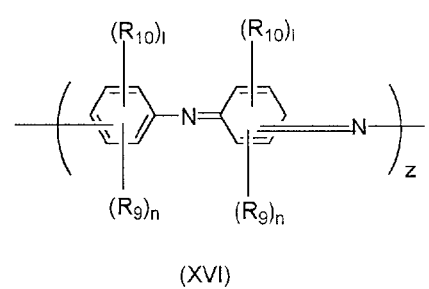
Figure 4:
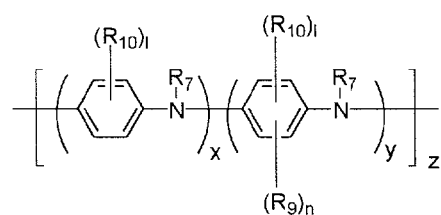
Figure 4:
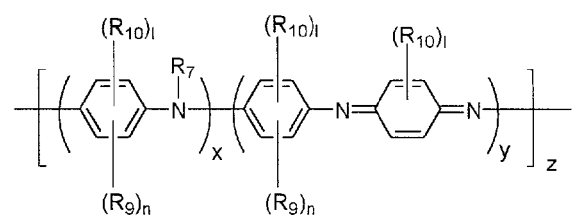
Figure 4:
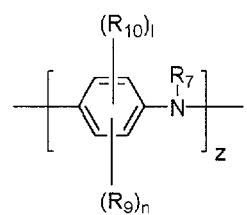
Figure 4:
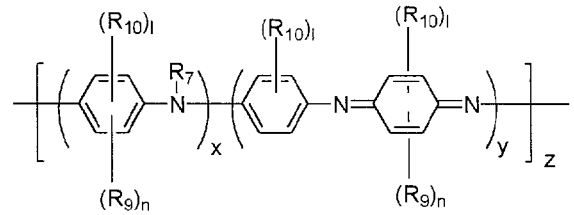

In the various embodiments of the present invention, the functionalized polyanilines of this invention comprise of the repeat units of the Formulas XV to XVI of FIG. 4, or a combination thereof, having various ratios of the above repeat units in the polyaniline backbone and presenting themselves as various oxidation state forms of polyanilines such as leucoemeraldine, protoemeraldine, emeraldine, nigraniline and pernigraniline.

Illustrative of the preferred functionalized polyanilines of the present invention are the polyanilines comprising of the repeat units of Formulas XV to XX of FIG. 4, wherein:

x and y are the same or different at each occurrence and are integers equal to or greater than 0, with the proviso that the sum of x and y is greater than 0, preferably where x is an integer equal to or greater than 0 and/or that the ratio of x to y is greater than or equal to about 0; and z is the same or different at each occurrence and is an integer equal to or greater than 0.

n is the same or different at each occurrence and is an integer from 0 to about 4;

l is the same or different at each occurrence and is an integer from 0 to 4, with the proviso that at least one occurring l is not zero and with the further proviso that the sum of n and l at the same occurring repeat unit is equal to or less than 4;

$R_9$ is the same or different at each occurrence and is selected from the group consisting of hydrogen, deuterium, alkyl, alkenyl, alkynyl, alkenynyl, aryl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, alkylaryl, arylalkyl, halo, hydroxyl, cyano, nitro, alkylsilane, amino, amido, arylamino, diarylamino, alkylamino, dialkylamino, alkylarylamino, alkoxyalkyl, aryloxyalkyl, alkoxycarbonyl, heterocyclic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate, acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters, and the like; or any of the foregoing aromatic or heteroaromatic or aliphatic or cycloaliphatic groups substituted with one or more acid functional groups, such as sulfonic acid, carboxylic acid, phosphonic acid, phosphoric acid, phosphinic acid, sulfinic acid, and the derivatives thereof, such as salts, esters, and the like; or any of the foregoing aromatic or heteroaromatic or aliphatic or cycloaliphatic groups substituted with one or more the functional groups selected from the group consisting of heterocyclic ring, heteroaromatic ring, alkoxy, aryloxy, alkanoyloxy, aryloyloxy, alkylthio, arylthio, arylamino, diarylamino, alkylamino, dialkylamino, alkylarylamino, halo, amino, nitro, hydroxyl, mercapto, cyano, or epoxy moieties; or any two $R_6$ groups together, or any $R_9$ group together with any $R_7$ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, ester, carbonyl, sulfonyl, or oxygen atoms wherein permissible substituents are one or more halo, nitro, amino, alkylamino, dialkylamino, arylamino, diarylamino, alkylarylamino, cyano, epoxy moieties, or acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters, and the like; and $R_7$ is the same or different at each occurrence and is selected from a group consisting of permissible $R_9$ subsituent or hydrogen;

$R_{10}$ is the same or different at each occurrence and is selected from hydrogen, or the functional groups consisting of substituted or unsubstituted alkylamino, arylamino, dialkylamino, diarylamino, alkylarylamino, cycloalkylamino, alkyleneamino, alkylphosphine, dialkylphosphine, arylphosphine, diarylphosphine, alkylarylphosine, cycloalkylphosphine, alkylenephosphine, alkylthio, arylthio, alkylthioalkylthio, alkylthioarylthio, arylthioarylthio, alkanoylthio, aryloylthio, alkoxycarbonylthio, aryloxycarbonylthio, vinyloxycarbonylthio, alkenyloxycarbonylthio, allyloxycarbonylthio, benzyloxycarbonylthio, arylalkyloxycarbonylthio, mercapto, mercaptoalkylthio, mercaptoarylalkylthio, mercaptoarylthio, mercaptoalkylarylthio, mercaptoalkylarylalkylthio, or mercaptoarylalkylarylthio, wherein permissible substituents are one or more aromatic or heteroaromatic or heteroalicyclic or alicyclic ring, alkyl, aryl, alkenyl, alkynyl, alkylene, arylene, alkenylene, alkynylene, halo, nitro, amino, alkylamino, dialkylamino, arylamino, diarylamino, alkylarylamino, cyano, hydroxyl, alkanoylthio, aryloylthio, alkoxycarbonylthio, aryloxycarbonylthio, alkylthio, arylthio, arylcarbonylthio, mercapto, epoxy moiety, or other permissible $R_9$ substituent, or acid functional group such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters and the like; or any two $R_{10}$ groups together, or any $R_{10}$ group together with any $R_9$ or $R_7$ group may form a substituted or unsubstituted alkylene, alkenylene or alkynylene chain, which chain may optionally include one or more divalent atoms or moieties, such as nitrogen, sulfur, sulfinyl, ester, carbonyl, sulfonyl, selenium, tellurium, phosphorus or oxygen, wherein permissible substituents are one or more aromatic or heteroaromatic or heteroalicyclic or alicyclic ring, alkyl, aryl, alkenyl, alkynyl, alkylene, arylene, alkenylene, alkynylene, halo, nitro, amino, alkylamino, dialkylamino, arylamino, diarylamino, alkylarylamino, cyano, hydroxyl, alkanoylthio, aryloylthio, alkoxycarbonylthio, aryloxycarbonylthio, alkylthio, arylthio, arylcarbonylthio, mercapto, epoxy moiety, or other permissible $R_9$ substituent, or acid functional group such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters and the like.

Illustrative of the more preferred functionalized polyanilines of the present invention are the polyanilines comprising of the repeat units of Formulas XVII to XX of FIG. 4, wherein:

x and y are the same or different at each occurrence and are integers equal to or greater than 0, with the proviso that the sum of x and y is greater than 0, preferably where x is an integer equal to or greater than 0 and/or that the ratio of x to y is greater than or equal to about 0; and z is the same or different at each occurrence and is an integer equal to or greater than 0.

n is the same or different at each occurrence and is an integer from 0 to about 4;

l is the same or different at each occurrence and is an integer from 0 to 4, with the proviso that at least one occurring l is not zero and with the further proviso that the sum of n and l at the same occurring repeat unit is equal to or less than 4;

$R_9$ is the same or different at each occurrence and is selected from the group consisting of hydrogen, deuterium, alkyl, alkenyl, alkynyl, alkenynyl, aryl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, alkylaryl, arylalkyl, halo, hydroxyl, cyano, nitro, alkylsilane, amino, amido, arylamino, diarylamino, alkylamino, dialkylamino, alkylarylamino, alkoxyalkyl, aryloxyalkyl, alkoxycarbonyl, heterocyclic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate, acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters, and the like; or any of the foregoing aromatic or heteroaromatic or aliphatic or cycloaliphatic groups substituted with one or more acid functional groups, such as sulfonic acid, carboxylic acid, phosphonic acid, phosphoric acid, phosphinic acid, sulfinic acid, and the derivatives thereof, such as salts, esters, and the like; or any of the foregoing aromatic or heteroaromatic or aliphatic or cycloaliphatic groups substituted with one or more the functional groups selected from the group consisting of heterocyclic ring, heteroaromatic ring, alkoxy, aryloxy, alkanoyloxy, aryloyloxy, alkylthio, arylthio, arylamino, diarylamino, alkylamino, dialkylamino, alkylarylamino, halo, amino, nitro, hydroxyl, mercapto, cyano, or epoxy moieties; or any two $R_6$ groups together, or any $R_9$ group together with any $R_7$ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, ester, carbonyl, sulfonyl, or oxygen atoms wherein permissible substituents are one or more halo, nitro, amino, alkylamino, dialkylamino, arylamino, diarylamino, alkylarylamino, cyano, epoxy moieties, or acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters, and the like; and $R_7$ is the same or different at each occurrence and is selected from a group consisting of permissible $R_9$ subsituent or hydrogen;

$R_{10}$ is the same or different at each occurrence and is selected from hydrogen, or the functional groups consisting of substituted or unsubstituted alkylamino, arylamino, dialkylamino, diarylamino, alkylarylamino, cycloalkylamino, alkyleneamino, alkylphosphine, dialkylphosphine, arylphosphine, diarylphosphine, alkylarylphosine, cycloalkylphosphine, alkylenephosphine, alkylthio, arylthio, alkylthioalkylthio, alkylthioarylthio, arylthioarylthio, alkanoylthio, aryloylthio, alkoxycarbonylthio, aryloxycarbonylthio, vinyloxycarbonylthio, alkenyloxycarbonylthio, allyloxycarbonylthio, benzyloxycarbonylthio, arylalkyloxycarbonylthio, mercapto, mercaptoalkylthio, mercaptoarylthio, mercaptoarylthio, mercaptoalkylarylthio, mercaptoalkylarylalkylthio, or mercaptoarylalkylarylthio, wherein permissible substituents are one or more aromatic or heteroaromatic or heteroalicyclic or alicyclic ring, alkyl, aryl, alkenyl, alkynyl, alkylene, arylene, alkenylene, alkynylene, halo, nitro, amino, alkylamino, dialkylamino, arylamino, diarylamino, alkylarylamino, cyano, hydroxyl, alkanoylthio, aryloylthio, alkoxycarbonylthio, aryloxycarbonylthio, alkylthio, arylthio, mercapto, epoxy moiety, or other permissible $R_9$ substituent, or acid functional group such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters and the like; or any two $R_{10}$ groups together, or any $R_{10}$ group together with any $R_9$ or $R_7$ group may form a substituted or unsubstituted alkylene, alkenylene or alkynylene chain, which chain may optionally include one or more divalent atoms or moieties, such as nitrogen, sulfur, sulfinyl, ester, carbonyl, sulfonyl, selenium, tellurium, phosphorus or oxygen, wherein permissible substituents are one or more aromatic or heteroaromatic or heteroalicyclic or alicyclic ring, alkyl, aryl, alkenyl, alkynyl, alkylene, arylene, alkenylene, alkynylene, halo, nitro, amino, alkylamino, dialkylamino, arylamino, diarylamino, alkylarylamino, cyano, hydroxyl, alkanoylthio, aryloylthio, alkoxycarbonylthio, aryloxycarbonylthio, alkylthio, arylthio, arylcarbonylthio, mercapto, epoxy moiety, or other permissible $R_9$ substituent, or acid functional group such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters and the like.

The particularly preferred functionalized polyanilines of the present invention are the polyanilines comprising of the repeat units of Formulas XVII to XX of FIG. 4, wherein:

x and y are the same or different at each occurrence and are integers equal to or greater than 0, with the proviso that the sum of x and y is greater than 0, preferably where x is an integer equal to or greater than 0 and/or that the ratio of x to y is greater than or equal to about 0; and z is the same or different at each occurrence and is an integer equal to or greater than 0.

n is the same or different at each occurrence and is an integer from 0 to about 4;

l is the same or different at each occurrence and is an integer from 0 to 4, with the proviso that at least one occurring l is not zero and with the further proviso that the sum of n and l at the same occurring repeat unit is equal to or less than 4;

$R_9$ and $R_7$ are as described above;

$R_{10}$ is the same or different at each occurrence and is selected from hydrogen, or the functional groups consisting of substituted or unsubstituted alkylthio, arylthio, alkylthioalkylthio, alkylthioarylthio, arylthioarylthio, alkanoylthio, aryloylthio, alkoxycarbonylthio, aryloxycarbonylthio, vinyloxycarbonylthio, alkenyloxycarbonylthio, allyloxycarbonylthio, benzyloxycarbonylthio, arylalkyloxycarbonylthio, mercapto, mercaptoalkylthio, mercaptoarylalkylthio, mercaptoarylthio, mercaptoalkylarylthio, mercaptoalkylarylalkylthio, or mercaptoarylalkylarylthio, wherein permissible substituents are one or more aromatic or heteroaromatic or heteroalicyclic or alicyclic ring, alkyl, aryl, alkenyl, alkynyl, alkylene, arylene, alkenylene, alkynylene, halo, nitro, amino, alkylamino, dialkylamino, arylamino, diarylamino, alkylarylamino, cyano, hydroxyl, alkanoylthio, aryloylthio, alkoxycarbonylthio, aryloxycarbonylthio, alkylthio, arylthio, arylcarbonylthio, mercapto, epoxy moiety, or other permissible $R_9$ substituent, or acid functional group such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters and the like; or any two $R_{10}$ groups together, or any $R_{10}$ group together with any $R_9$ or $R_7$ group may form a substituted or unsubstituted alkylene, alkenylene or alkynylene chain, which chain may optionally include one or more divalent atoms or moieties, such as nitrogen, sulfur, sulfinyl, ester, carbonyl, sulfonyl, selenium, tellurium, phosphorus or oxygen, wherein permissible substituents are one or more aromatic or heteroaromatic or heteroalicyclic or alicyclic ring, alkyl, aryl, alkenyl, alkynyl, alkylene, arylene, alkenylene, alkynylene, halo, nitro, amino, alkylamino, dialkylamino, arylamino, diarylamino, alkylarylamino, cyano, hydroxyl, alkanoylthio, aryloylthio, alkoxycarbonylthio, aryloxycarbonylthio, alkylthio, arylthio, arylcarbonylthio, mercapto, epoxy moiety, or other permissible $R_9$ substituent, or acid functional group such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters and the like.

More particularly, an embodiment of the method of the present invention comprises the steps of:
(a) providing polyaniline in a solid state form; and
(b) subjecting the resultant polyaniline to a reaction treatment with a solution of reactive chemical reagent(s) in a selected solvent or solvent mixture for a period of time, the solvent or solvent mixture is capable of dissolving or dispersing the chemical reagent(s) and swelling or wetting the solid state polyaniline, and the chemical reagent(s) is capable of functionalizing the solid state polyaniline and transforming the backbone of the solid state polyaniline into a more reduced form.

Figure 1:
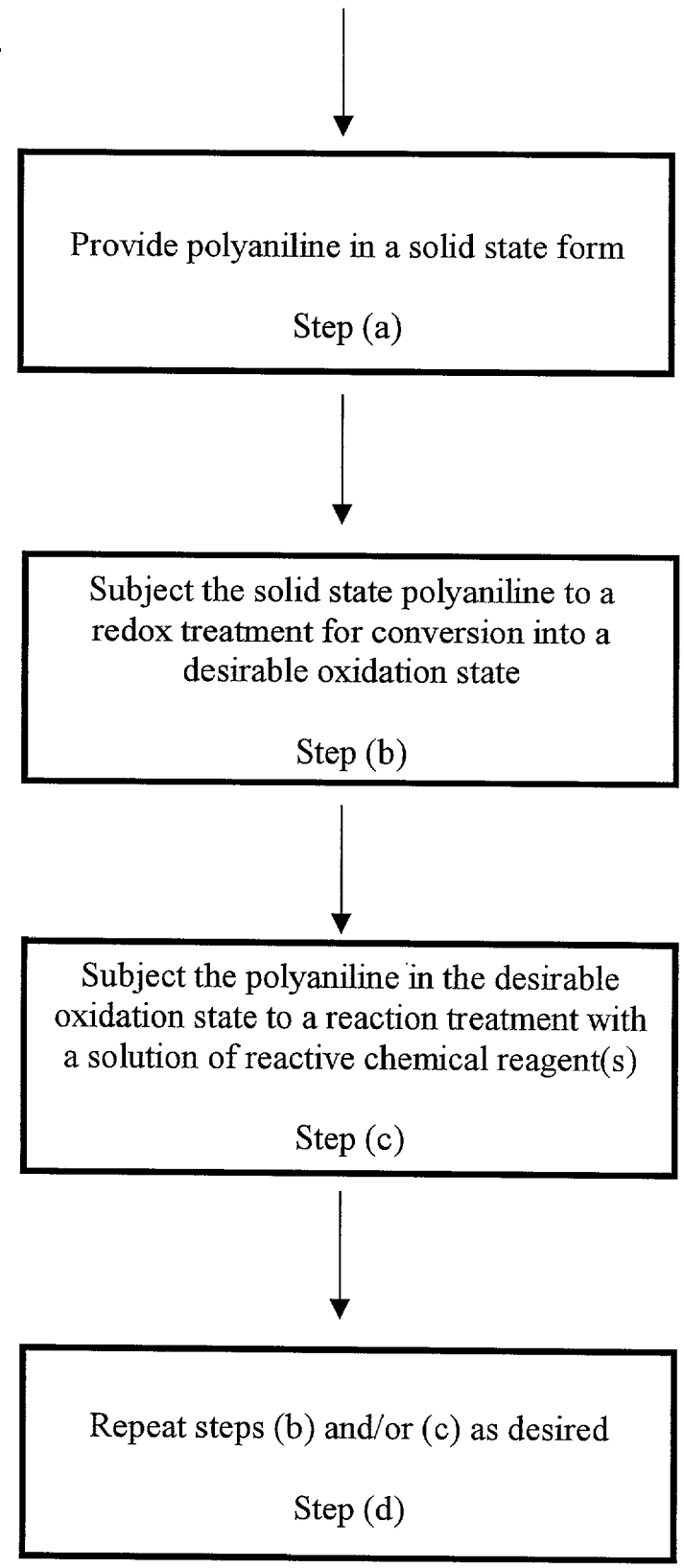
FIG. 1 is a flow diagram generally illustrating the method according to the present invention.

Referring to FIG. 1, another embodiment of the method of the present invention comprises the steps of:
(a) providing polyaniline in a solid state form;
(b) subjecting the solid state polyaniline to a redox treatment to convert the backbone of the solid state polyaniline into a desirable oxidation state;
(c) subjecting the resultant polyaniline to a reaction treatment with a solution of reactive chemical reagent(s) in a selected solvent or solvent mixture for a period of time, where the solvent or solvent mixture is capable of dissolving or dispersing the chemical reagent(s), and swelling or wetting the solid state polyaniline, where the chemical reagent(s) is capable of functionalizing the solid state polyaniline and transforming the backbone of the solid state polyaniline into a more reduced form; and
(d) repeating steps (b) and/or (c);

wherein steps (b) and (c) can be reversed, or step (b) or step (c) can be omitted as desired in the first cycle or any subsequent repeat cycles of the redox/reaction treatments. The reaction treatment is performed for a time period sufficient to convert the resultant polyaniline to an oxidation state equal to or higher than the oxidation state of the original solid state polyaniline.

In a preferred embodiment of the method according to the present invention, the polyaniline provided in step (a) is in a solid state form, such as powder, coating, films, pressed powder, multi-layer coating, laminated film, or any other solid state forms known in the art, and any combination thereof A preferred solid state polyaniline is a polyaniline film or coating, which can be prepared from a solution of polyaniline using solution casting, dipping coating, spray coating, spin coating, brush coating, or any other methods known in the art. The polyaniline film or coating can also be prepared from a solid state form of polyaniline or its mixture with any conventional polymers, binders, or dopants using melt casting, hot-pressing, thermal evaporation coating, or any other methods known in the art. The polyaniline film or coating can also be prepared from its corresponding aniline monomer using reaction coating, any suitable electrochemical polymerization method, or other methods known in the art.

In step (b), the reactive chemical reagent(s) can be any agents that can functionalize (or derivatize) the polyaniline of step (a) and transform the backbone of the solid state polyaniline into a more reduced form. In this reaction treatment step, a reaction solution containing one or more types of reactive chemical reagents can also be used either concurrently or sequentially, depending on the specific application.

Preferred reactive chemical reagents are thiols, amines, phophines, which can be in either a neat state or a solution state. If a solution of such reactive chemical reagent(s) is employed, any concentration can be used as long as the reaction rate is acceptable at a given temperature. Any solvent or solvent mixture can be used in implementing the method of the present invention as long as it can dissolve or disperse the reactive chemical reagent(s), and swell or wet the solid state polyaniline, such as $H_2O$, methanol, ethanol, THF (tetrahydrofuran), mixtures of $H_2O$ and NMP (N-methylpyrrolidinone), mixtures of $H_2O$ and THF, and the like.

When the polarity of the polyaniline is very different from that of the chemical reagent, a co-solvent (or solvent mixture) can be used in implementing the method of the present invention. In this case, a co-solvent mixture containing at least one component that can dissolve or disperse the chemical reagent and another component that can swell or wet the surface of the solid state polyaniline can be used.

The solvent or solvent mixture selected for use in implementing the method of the present invention depends primarily on the polarity of the polyanilines and the chemical reagents employed. In general, more polar polyanilines and chemical reagents require solvents with higher dielectric constants and dipole moments. Conversely, less polar polyanilines and chemical reagents require solvents with lower dielectric constants and dipole moments.

In general, solvents or solvent mixtures chosen for use with polyanilines and chemical reagents of relatively polar have a dipole moment of approximately 0.3 to about 5.0, and a dielectric constant of about 10 to about 190. In a preferred embodiment according to the present invention, the dipole moment and the dielectric constant are approximately 1.8 to 5.0, and about 20 to about 100, respectively. Illustrative of the solvents are alcohols, linear and cyclic ethers, halocarbons, amides, substituted aromatics, nitrites, carbonates, sulfoxides and other sulfur containing solvents, nitro substituted alkanes and aromatics, water and mixtures thereof. Exemplary alcohols include methanol, ethanol, isopropanol, and the like. Illustrative linear and cyclic ethers include tetrahydrofuran, tetrahydropyran, 2-methyltetrahydrofuran, diethyl ether, diglyme, glyme and the like. Exemplary halocarbons include chloroform, 1,2-dichloroethane, dichloromethane and the like. Illustrative amides include dimethylformamide, N,N-dimethylacetamide, N-methyl pyrrolidinone and the like. Illustrative substituted aromatics include xylene, anisole, toluene and the like. Exemplary nitrites include acetonitrile, propionitrile, benzonitrile, butyronitrile, and the like. Illustrative sulfoxides and other sulfur containing solvents include dimethylsulfoxide and the like. Illustrative nitro substituted alkanes and aromatics include nitromethane, nitropropane, nitrobenzene and the like. Exemplary carbonates include propylene carbonate, ethylene carbonate and the like.

In general, solvents or solvent mixtures chosen for use with the polyanilines and relatively non-polar chemical reagents have a dipole moment of 0 to about 3.0, preferably 0 to about 2.5, and a dielectric constant of approximately 2.0 to about 50, preferably about 2.0 to about 35. Illustrative of such solvents are halocarbons such as dichloromethane and the like, aromatic solvents such as toluene, xylene, benzene and the like, cyclic and linear ethers such as dimethoxyethane, tetrahydrofuran and the like, esters such as ethylacetate, methyl formate and the like, sulfoxides such as dimethylsulfoxide and the like, cyclic and linear amides such as dimethylformamide, N-methylpyrrolidinone, N,N-dimethylacetamide and the like, and ketones such as acetone and the like, and mixtures thereof In general, the amount of solvent or solvent mixture employed for the reaction media is not critical, so long as the chemical reagents can be dissolved or dispersed, and the solid state polyanilines can be swelled or wetted. A neat chemical reagent can also be used as long as it is in a liquid state under the reaction temperatures or conditions, and that it can swell or wet the solid state polyanilines.

The chemical reactions can be performed under any temperature so long as the reaction rate is acceptable, or that the polyanilines or the chemical reagents are not significantly destroyed at such temperature. The chemical reactions can be performed in any atmosphere as long as it will not significantly destroy the chemical reagents or polyanilines, such as $N_2$, Ar, He, Ne, air, $O_2$, and the like. If a precise control on the substitution degree and substitution pattern is needed, then an inert atmosphere is preferred, such as $N_2$, Ar, He, Ne. A catalytic amount of protonic acid or Lewis acid can be optionally added to the reaction mixture to increase the reaction rate. The reaction time can vary widely, depending on the reaction rate between the chemical reagents and the polyanilines under the employed reaction conditions, and also depending on the desired degree of derivatization.

An important feature of the chemical reactions is that as the reactive chemical reagent reacts with the polyanilines and becomes attached to the polyaniline backbone. The attached polyaniline backbone concurrently transforms into a more reduced state.

The backbone of a polyaniline comprises diiminoquinoid and diaminobenzenoid rings. A typical unsubstituted polyaniline has a backbone structure as represented by Formula I in FIG. 2, where a and b are real numbers, a+b=1, $0 \leq a \leq 1$, and $0 \leq b \leq 1$. In general, the lower the ratio of a/b is, the higher the oxidation degree of the polyaniline backbone. Conversely, the higher the ratio of a/b is, the higher the reduction degree of the polyaniline backbone. A more reduced polyaniline backbone is indicated by the relative increase of the ratio of a/b. The increase in the reduction degree can be generally observed by an infrared (IR) spectroscopy as indicated by the increase in the intensity of the vibration peak at ca. 1500 $cm^{-1}$ (for the C═C stretching vibration of the diaminobenzenoid ring) relative to that at ca. 1600 cm$^{-1}$ (for the C=C stretching vibration of the diiminoquino ring) for an undoped polyaniline specimen.

In another embodiment of the method according to the present invention, an optional redox treatment step can be applied before or after the reaction treatment step with chemical reagent(s). The redox treatment can be used to adjust the redox degree of the polyaniline to a desirable level that is suitable for the subsequent reaction treatment or application. The redox treatment can be performed by chemical or electrochemical means. The chemical means is conducted by treating the resultant solid state polyanline with oxidizing or reducing gas, such as $O_2$, air, $H_2$, other oxidizing gas, or with oxidizing or reducing chemicals, such as APS (Ammonium peroxy sulfate), MCPBA (m-chloroperoxybenzoic acid), $FeCl_3$, chromic acid, $K_2Cr_2O_7$, $Na_2Cr_2O_7$, $H_2O_2$, or any other oxidants known in the art, $H_2NNH_2$, phenylhydrazine, $LiAlH_4$, $NaBH_4$, or any other reductants known in the art, for a time sufficiently long enough to obtain a desirable redox state. The redox treatment can be performed in any temperature as long as the reaction rate is acceptable or the polyaniline is not significantly destroyed at such temperature.

The redox treatment step can also be carried out via an electrochemical means. The electrochemical means is conducted firstly by placing, attaching or coating the solid state polyaniline on or to a conductive substrate or surface, then connecting such conductive substrate or surface to a typical electrochemical cell or device, followed by subjecting the polyaniline to a desirable electrochemical potential to convert such polyaniline into a desirable redox state.

The preferred conductive substrates or surfaces are metals (such as platinum, stainless steel, iron, gold, silver, copper, and the like), metal alloys, ITO (indium tin oxide) glasses, p-type or n-type doped silicon, conductive metal oxides, or any other conductive surfaces or substrates known in the art.

The electrochemical voltage applied in each process can vary widely from about −0.2 V (vs. SCE or saturated calomel electrode) to about 0.9 V (vs. SCE) depending on the types of polyanilines employed and the desired substitution degree. In general, the higher the voltage is applied, the higher the oxidation degree of the polyaniline. The higher the oxidation degree of the polyaniline employed for the reaction with the chemical reagents, the higher the substation degree of the resultant polyaniline.

Such redox process can also be omitted for the applications where the desirable substitution degree is less than 25 mol % (basing on the polyaniline repeat unit) and the exact control on the substitution degree is not critical. In this case, a polyaniline as in its most stable emeraldine oxidation state (containing about 25 mol % of diiminoquinoid ring) can be used to directly perform the reaction treatment step with the chemical reagents without the need of a redox pre-treatment step. The redox treatment step is, however, particularly needed especially for the applications where the desirable substitution degree is more than 25 mol % (basing on the polyaniline repeat unit), and/or the exact control on the substitution degree is needed.

Nevertheless, in either of the above cases, a redox post-treatment step can be optionally added after the reaction treatment step to convert the resultant polyaniline to a desirable oxidation state to achieve optimal performance for the desired applications. For example, the resultant polyaniline can be electrically forced to 0.2–0.3 V (vs. SCE or saturated calomel electrode) after the reaction treatment step with the chemical reagents in order to quickly achieve its most conductive states. This capability is particularly important for the applications on semiconductor device applications, wherein a subsequent fabrication process immediately follows.

There are also some applications, such as anti-corrosion coatings, wherein the resulting polyaniline articles (as in the forms of surface layers, or films, or coatings) are exposed to an air atmosphere and a quick transformation to the most conductive states (i.e., the emeraldine oxidation state) is also not needed. In these cases, the resulting polyaniline articles can be slowly oxidized by the surrounding air atmosphere to gradually reach the most conductive and stable emeraldine oxidation state. There are also some applications, wherein a particular oxidation state of polyaniline other than the emeraldine oxidation state is needed. Then, in these cases, a post-redox treatment is a needed treatment step.

Such redox treatment and reaction treatment steps can also be applied in any desirable combination sequence and number of repeating treatment cycles. The chemical reagent (s) used in every repeating treatment cycle can be the same as or different from that used in any of the previous reaction treatment step(s). If the chemical reagent(s) used in the repeating treatment cycle is the same as that in the previous reaction treatment cycle, then the amount of the substituent derived from the chemical reagents is increased. In this case, the method according to the present invention can be used to prepare polyanilines having a specified degree of substitution to perform a desired property for particular applications. For example, the resultant polyaniline can be rendered with THF (tetrahydrofuran) solubility by subjecting an unsubstituted polyaniline film on a Pt (platinum) electrode with three treatment cycles, which contained in each cycle a redox treatment step of electrical enforcement of the polyaniline film at 0.5 V (vs. SCE or saturated calomel electrode) in a 0.5 M aqueous solution of $H_2SO_4$ and a reaction treatment step of soaking the polyaniline film in a 0.2 M methanolic solution of dodecane-1-thiol for 60 minutes. After the above treatments, the resultant polyaniline contains approximately 45–50 mol % of dodecylthio substituent basing on the polyaniline repeat units and becomes readily soluble in THF, which is actually a non-solvent for the parent unsubstituted polyaniline.

If the chemical reagent(s) used in the repeating treatment cycle is different from the previous reaction treatment cycle, then the variety of types of substituents on the same polyaniline backbone is increased. For example, an unsubstituted polyaniline film on a Pt electrode is subjected to three similar reaction treatment cycles as described in the above except that the thiols employed in each cycle were different, and were mercaptoacetic acid, dodecane-1-thiol, and mercaptoethanesulfonic acid, respectively The resultant polyaniline contains three different functional groups on the same polyaniline backbone, and had been therefore rendered with multiple capabilities, such as self-doping ability and improved solubility.

ILLUSTRATIVE EXAMPLES OF THE REACTIVE CHEMICAL REAGENTS

The reactive chemical reagents used in the present invention can be any agents as long as they can derivatize the polyaniline and concurrently result in a more reduced polyaniline backbone. Examples of the preferred reactive chemical reagents are thiols, phophines and amines. Illustrative of preferred reactive chemical reagents are the Formulas II to VII in FIG. 2, wherein:

$R_1$, or $R_2$ and $R_3$ are the same or different at each occurrence and are selected from the group consisting of hydrogen or isotopes thereof, alkyl, alkenyl, alkynyl, alkenynyl, aryl, alkylaryl, arylalkyl, allyl, benzyl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, mercaptoalkoxy, mercaptoaryloxy, mercaptoalkyl, mercaptoaryl, mercaptoarylthio, mercaptoalkylthio, mercaptoalkylarylalkyl, mercaptoaryl alkylaryl, halo, hydroxyl, hydroxyalkyl, hydroxyaryl, cyano, alkylsilane, amino, aminoalkyl, aminoaryl, amido, amidoalkyl, amidoaryl, arylamino, diarylamino, alkylamino, dialkylamino, alkylarylamino, alkoxyalkyl, aryloxyalkyl, alkoxycarbonyl, alkoxysilylalkyl, alkylsilylalkyl, alkoxysilylaryl, alkylsilylaryl, heterocyclic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate, or any of the foregoing aromatic or heteroaromatic or aliphatic or cycloaliphatic groups substituted with one or more acid functional groups, such as sulfonic acid, carboxylic acid, phosphonic acid, phosphoric acid, phosphinic acid, sulfinic acid, and the derivatives thereof, such as salts, esters, and the like; or any of the foregoing aromatic or heteroaromatic or aliphatic or cycloaliphatic groups substituted with one or more the functional groups selected from the group consisting of heterocyclic ring, heteroaromatic ring, alkyl aryl, allyl, benzyl, alkoxy, aryloxy, alkanoyloxy, aryloyloxy, alkylthio, arylthio, mercaptoalkoxy, mercaptoaryloxy, mercaptoalkyl, mercaptoaryl, mercaptoarylthio, mercaptoalkylthio, mercaptoalkylarylalkyl, mercaptoaryl, arylamino, diarylamino, alkylamino, dialkylamino, alkylarylamino, halo, nitro, hydroxyl, hydroxyalkyl, hydroxyaryl, alkylsilane, alkoxysilane, amimo, aminoalkyl, aminoaryl, amido, amidoalkyl, amidoaryl, mercapto, cyano, epoxy moieties, or permissible $R_1$ or $R_2$ or $R_3$ groups; or derivatives of a moiety of the formula:

wherein:

$R_4$ is a divalent alkylene moiety having from 1 to about 7 carbon atoms;

$R_5$ is alkyl having from 1 to about 20 carbon atoms; and r is a natural number from 1 to about 50; or $R_2$ and $R_3$ substituents taken together may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more degrees of unsaturation, or one or more heteroatoms of nitrogen, sulfur, sulfinyl, sulfonyl, phosphorus, selenium, ester, carbonyl, or oxygen atoms, one or more substituent groups selected from permissible $R_1$, or $R_2$, or $R_3$ substituents.

M is selected from a group consisting of a non-metal cation such as $Bu_4N^+H^+$, $NO^+$, $NO_2^+$, $NH_4^+$, $^+N(CH_3)_2H_2$, $^+N(C_2H_5)H_3$, and the like, or a metal cation such as $Na^+$, $Li^+$, $K^+$, $Mg^{2+}$, $Ca^{2+}$, $Ag^+$, $Ba^{+2}$, $Co^{+3}$, $Al^{+3}$, $Fe^{+3}$ and the like.

Illustrative of useful $R_1$, $R_2$, $R_3$, $R_4$, $R_5$ groups are hydrogen; hydroxyl; cyano; halo; alkyl such as methyl, ethyl, butyl, pentyl, octyl, nonyl, tert-butyl, neopentyl, isopropyl, sec-butyl, dodecyl and the like; alkenyl such as 1-propenyl, 4-butenyl, 1-pentenyl, 6-hexenyl, 1-heptenyl, 8-octenyl and the like; alkoxy such as propoxy, butoxy, methoxy, isopropoxy, pentoxy, nonyloxy, ethoxy, octyloxy, and the like; alkanoyl such as butanoyl, pentanoyl, octanoyl, ethanoyl, propanoyl and the like; arylamino and diarylamino such as phenylamino, diphenylamino and the like; alkylsulfinyl, alkylsulfonyl, alkylthio, arylsulfonyl, arylthio such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio, and the like; alkoxycarbonyl such as methoxycarbonyl, ethoxycarbonyl, butoxycarbonyl and the like; alkylamino and dialkylamino such as dimethylamino, methylamino, diethylamino, ethylamino, dibutylamino, butylamino and the like; cycloalkyl such as cyclohexyl, cyclopentyl, cyclooctyl, cycloheptyl and the like; alkoxyalkyl such as methoxymethylene, ethoxymethylene, butoxymethylene, propoxyethylene, pentoxybutylene and the like; arylalkylamino such as methylphenylamino, ethylphenylamino and the like; aryloxyalkyl and aryloxyaryl such as phenoxyphenylene, phenoxymethylene and the like; and various substituted alkyl and aryl groups such as 1-hydroxybutyl, 1-aminobutyl, 1-hydroxylpropyl, 1-hydroxypentyl, 1-hydroxyoctyl, 1-hydroxyethyl, 2-nitroethyl, trifluoromethyl, 3,4-epoxy-butyl, cyanomethyl, 3-chloropropyl, 4-nitrophenyl, 3-cyanophenyl, 1-hydroxymethyl, and the like; hydroxyl terminated alkyl and aryl groups such as 2-hydroxyethyl, 4-hydroxybutyl and 4-hydroxyphenyl, and the like; sulfonic acid, carboxylic acid and phosphonic acid terminated alkyl and aryl groups such as ethylsulfonic acid, propylsulfonic acid, butylsulfonic acid, phenylsulfonic acid, and the corresponding carboxylic and phosphonic acids and derivatives of the sulfonic, carboxylic and phosphonic acids as for example salts, esters and the like. Exemplary of other useful $R_1$ to $R_3$ groups are moieties of the formula:

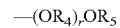

wherein r, $R_4$ and $R_5$ are as described above. Useful $R_4$ groups include divalent moieties of the formulas $—(CH_2)_2—$, $—(CH_2)_3—$, $—(CH_2)_4—$, and $—(CH_2CH(CH_3))—$, and useful $R_5$ groups include $—CH_3$, $—CH_2CH_3$ and $—(CH_2)_8CH_3$. Illustrative of substituents having such $R_4$ and $R_5$ are ethyleneglycol monomethylether, diethylene glycol monomethylether, triethylene glycol monomethylether, tetraethylene glycol monomethylether, and the like.

In addition, examples of the preferred reactive chemical reagents are thiols and phophines. Illustrative of preferred reactive chemical reagents are the Formulas II to IV in FIG. 2, wherein:

$R_1$, or $R_2$ and $R_3$ are the same or different at each occurrence and are selected from the group consisting of hydrogen or isotopes thereof, alkyl, alkenyl, alkynyl, alkenynyl, aryl, alkylaryl, arylalkyl, allyl, benzyl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, mercaptoalkoxy, mercaptoaryloxy, mercaptoalkyl, mercaptoaryl, mercaptoarylthio, mercaptoalkylthio, mercaptoalkylarylalkyl, mercaptoaryl alkylaryl, halo, hydroxyl, hydroxyalkyl, hydroxyaryl, cyano, alkylsilane, amino, aminoalkyl, aminoaryl, amido, amidoalkyl, amidoaryl, arylamino, diarylamino, alkylamino, dialkylamino, alkylarylamino, alkoxyalkyl, aryloxyalkyl, alkoxycarbonyl, alkoxysilylalkyl, alkylsilylalkyl, alkoxysilylaryl, alkylsilylaryl, heterocyclic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate, or any of the foregoing aromatic or heteroaromatic or aliphatic or cycloaliphatic groups substituted with one or more acid functional groups, such as sulfonic acid, carboxylic acid, phosphonic acid, phosphoric acid, phosphinic acid, sulfinic acid, and the derivatives thereof, such as salts, esters, and the like; or any of the foregoing aromatic or heteroaromatic or aliphatic or cycloaliphatic groups substituted with one or more the functional groups selected from the group consisting of heterocyclic ring, heteroaromatic ring, alkyl, aryl, allyl, benzyl, alkoxy, aryloxy, alkanoyloxy, aryloyloxy, alkylthio, arylthio, mercaptoalkoxy, mercaptoaryloxy, mercaptoalkyl, mercaptoaryl, mercaptoarylthio, mercaptoalkylthio, mercaptoalkylarylalkyl, mercaptoaryl, arylamino, diarylamino, alkylamino, dialkylamino, alkylarylamino, halo, nitro, hydroxyl, hydroxyalkyl, hydroxyaryl, alkylsilane, alkoxysilane, amimo, aminoalkyl, aminoaryl, amido, amidoalkyl, amidoaryl, mercapto, cyano, epoxy moieties, or permissible $R_1$ or $R_2$ or $R_3$ groups; or derivatives of a moiety of the formula:

—(OR$_4$)$_r$OR$_5$ wherein:

$R_4$ is a divalent alkylene moiety having from 1 to about 7 carbon atoms;

$R_5$ is alkyl having from 1 to about 20 carbon atoms; and r is a natural number from 1 to about 50; or $R_2$ and $R_3$ substituents taken together may form a substituted or unsubstituted alkylene, alkenylene or alkynylene chain completing a 3, 4, 5, 6, 7, 8, 9 or 10 membered aromatic, heteroaromatic, heteroalicyclic, or alicyclic ring, which ring may optionally include one or more degrees of unsaturation, or one or more heteroatoms of nitrogen, sulfur, sulfinyl, sulfonyl, phosphorus, selenium, ester, carbonyl, or oxygen atoms, one or more substituent groups selected from permissible $R_1$, or $R_2$, or $R_3$ substituents.

A particular preferred embodiment of the reactive chemical reagents according to the present invention includes thiols. Illustrative of preferred reactive chemical reagents are the Formulas II in FIG. 2, wherein:

$R_1$ is selected from the group consisting of hydrogen or isotopes thereof, alkyl, alkenyl, alkynyl, alkenynyl, aryl, alkylaryl, arylalkyl, allyl, benzyl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, mercaptoalkoxy, mercaptoaryloxy, mercaptoalkyl, mercaptoaryl, mercaptoarylthio, mercaptoalkylthio, mercaptoalkylarylalkyl, mercaptoaryl alkylaryl, halo, hydroxyl, hydroxyalkyl, hydroxyaryl, cyano, alkylsilane, amino, aminoalkyl, aminoaryl, amido, amidoalkyl, amidoaryl, arylamino, diarylamino, alkylamino, dialkylamino, alkylarylamino, alkoxyalkyl, aryloxyalkyl, alkoxycarbonyl, alkoxysilylalkyl, alkylsilylalkyl, alkoxysilylaryl, alkylsilylaryl, heterocyclic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate, or any of the foregoing aromatic or heteroaromatic or aliphatic or cycloaliphatic groups substituted with one or more acid functional groups, such as sulfonic acid, carboxylic acid, phosphonic acid, phosphoric acid, phosphinic acid, sulfinic acid, and the derivatives thereof, such as salts, esters, and the like; or any of the foregoing aromatic or heteroaromatic or aliphatic or cycloaliphatic groups substituted with one or more the functional groups selected from the group consisting of heterocyclic ring, heteroaromatic ring, alkyl, aryl, allyl, benzyl, alkoxy, aryloxy, alkanoyloxy, aryloyloxy, alkylthio, arylthio, mercaptoalkoxy, mercaptoaryloxy, mercaptoalkyl, mercaptoaryl, mercaptoarylthio, mercaptoalkylthio, mercaptoalkylarylalkyl, mercaptoaryl, arylamino, diarylamino, alkylamino, dialkylamino, alkylarylamino, halo, nitro, hydroxyl, hydroxyalkyl, hydroxyaryl, alkylsilane, alkoxysilane, amimo, aminoalkyl, aminoaryl, amido, amidoalkyl, amidoaryl, mercapto, cyano, epoxy moieties, or permissible $R_1$ groups; or derivatives of a moiety of the formula:

—(OR$_4$)$_r$OR$_5$ wherein:

$R_4$ is a divalent alkylene moiety having from 1 to about 7 carbon atoms;

$R_5$ is alkyl having from 1 to about 20 carbon atoms; and r is a natural number from 1 to about 50.

The following listed thiols are illustrative of those which can be used in the practice of the present invention, including:

| | |
|---|---|
| 2-Acetamido-2-deoxy-1-thio-β-D-glucopyranose 3,4,6-triacetate | 2-Aminothiophenol |
| | 4-Aminothiophenol |
| 4-Acetamidothiophenol | 1,2-Benzenedithiol |
| Allyl mercaptan | 1,3-Benzenedithiol |
| 2-Aminoethanethiol | Benzyl mercaptan |
| 2-Aminoethanethiol hydrochloride | 2-Bromothiophenol |
| 3-Amino-5-mercapto-1,2,4-triazole | 3-Bromothiophenol |
| 5-Amino-1,3,4-thiadiazole-2-thiol | 4-Bromothiophenol |
| 2-Aminothiophenol | 1,4-Butanedithiol |
| 2,3-Butanedithiol | 3,4-Dimercaptotoluene |
| 1-Butanethiol | 2-Dimethylaminoethanethiol hydrochloride |
| 2-(Butylamino)ethanethiol | |
| 4-Chloro-1,3-benzenedithiol | 2,4-Dimethylthiophenol |
| 2-Chlorobenzyl mercaptan | 2,5-Dimethylthiophenol |
| 4-Chlorobenzyl mercaptan | 2,6-Dimethylthiophenol |
| 5-Chloro-2-mercaptobenzothiazole | 3,4-Dimethylthiophenol |
| 3-Chloro-1-propanethiol | 4,5-Diphenyl-2-imidazolethiol |
| 2-Chlorothiophenol | Dithioerythritol |
| 3-Chlorothiophenol | Dithiothreitol |
| 4-Chlorothiophenol | 1,4-Dithio-L-threitol |
| Cyclohexyl mercaptan | 1-Dodecanethiol |
| Cyclopentyl mercaptan | tert-Dodecanethiol |
| 1-Decanethiol | Durene-α$_1$, α$_2$-dithiol |
| 2,5-Dichlorobenzenethiol | 1,2-Ethanedithiol |
| 2,6-Dichlorobenzenethiol | Ethanethiol |
| 3,4-Dichlorobenzenethiol | 6-Ethoxy-2-mercaptobenzothiazole |
| 2-Diethylaminoethanethiol hydrochloride | Ethylene glycol bisthioglycolate |
| 2,3-Dimercapto-1-propanesulfonic acid, sodium salt | Ethyl 2-mercaptoacetate |
| | Ethyl 3-mercaptopropionate |
| 2,3-Dimercapto-1-propanol | 2-Ethylthiophenol |
| 2,5-Dimercapto-1,3,4-thiadiazole | 4-Fluorothiophenol |
| 2,5-Dimercapto-1,3,4-thiadiazole, dipotassium salt | Furfuryl mercaptan |
| | Heptyl mercaptan |
| Hexadecyl mercaptan | 2-Mercaptonicotinic acid |
| 1,6-Hexanedithiol | 2-Mercapto-5-nitro-benzimidazole |
| 1-Hexanethiol | 3-Mercapto-1,2-propanediol |
| 1,2,6-Hexanetriot trithioglycolate | 1-Mercapto-2-propanol |
| 4-Hydroxythiophenol | 3-Mercaptopropionic acid |
| 2-Isopropylthiophenol | (3-Mercaptopropyl)trimethoxysilane |
| Mercaptoacetic acid | 4-Mercapto-1H-pyrazolo[3,4-d]pyrimidine |
| Mercaptoacetic acid, sodium salt | |
| 2-Mercaptobenzimidazole | 2-Mercaptopyridine |
| 2-Mercaptobenzothiazole | 4-Mercaptopyridine |
| 2-Mercaptobenzoxazole | 2-Mercaptopyridine N-oxide |
| 3-Mercapto-2-butanol | 2-Mercaptopyridine N-oxide, sodium salt hydrate |
| 2-Mercaptoethanesulfonic acid, sodium salt | |
| | 2-Mercapto-3-pyridinol |
| 2-Mercaptoethanol | 2-Mercapto-4(3H)-quinazolinone |
| 2-Mercaptoethyl ether | Mercaptosuccinic acid |
| 2-Mercaptoethyl sulfide | 2-Mercaptothiazoline |
| 2-Mercaptoimidazole | Methanethiol |
| 8-Mercaptomenthone | 2-Methoxybenzenethiol |

-continued

| | |
|---|---|
| 2-Mercapto-5-methylbenzimidazole | 3-Methoxybenzenethiol |
| 2-Mercapto-1-methylimidazole | 4-Methoxybenzenethiol |
| 2-Mercapto-1-methylimidazole | 4-Methoxy-α-toluenethiol |
| 5-Mercapto-1-methyltetrazole, sodium salt hydrate | 2-Methyl-1-butanethiol |
| | 2-Methyl-2-butanethiol |
| 3-Methy-1-butanethiol | 1,3-Propanedithiol |
| 2-Methyl-3-furanthiol | 1-Propanethiol |
| Methyl 3-mercaptopropionate | 2-Propanethiol |
| 1-Methyl-1-propanethiol | Purpald ® |
| 2-Methyl-1-propanethiol | 2-Ouinolinethiol |
| 2-Methyl-2-propanethiol | Sodium thiomethoxide |
| Methyl thioglycolate | 2,3,5,6-Tetrachloro-4-pyridinethiol |
| 4-Methyl-4H-1,2,4-triazole-3-thiol | 2,3,5,6-Tetrafluoro-thiophenol |
| 2-Naphthalenethiol | Thiobenzoic acid |
| 4-Nitrothiophenol | Thiocholesterol |
| 2-Nitro-4-(trifluoromethyl)thiophenol | o-Thiocresol |
| 1,9-Nonanedithiol | m-Thiocresol |
| Nonyl mercaptan | p-Thiocresol |
| Octadecyl mercaptan | Thiolacetic acid |
| 1,8-Octanedithiol | Thiophenol |
| 1-Octanethiol | Thiosalicylic acid |
| Pentafluorothiophenol | 1H-1,2,4-Triazole-3-thiol |
| 1,5-Pentanedithiol | 7-Trifluoromethyi-4-quinolinethiol |
| 1-Pentanethiol | Triphenylmethyl mercaptan |
| Phenethyl mercaptan | o-Xylene-α,α'-dithiol |
| 3-Phenylpropyl mercaptan | m-Xylene-α,α'-dithiol |
| 1-Phenyl-1H-tetrazole-5-thiol | p-Xylene-α,α'-dithiol |

ILLUSTRATIVE EXAMPLES OF THE POLYANILINES

Polyanilines are homopolymers or copolymers in which at least 50 mol % of the recurring backbone monomeric units in vary ratio are selected from the group consisting of substituted or unsubstituted phenyl rings and amine linkages (—NH— or —NR— where R is a substituent other than hydrogen) with varying amounts of substituted or unsubstituted quinoid rings and imine (—N=) linkages. Neutral or undoped polyaniline is characterized by an uncharged polyaniline backbone. Electrically conductive or doped polyaniline is characterized by a charged backbone which may be formed by a partial or complete protonation of the amine and/or inline nitrogen atoms.

Any form of such polyanilines can be conveniently used in the practice of the present invention. Illustrative of useful forms are those described in Green, A. G. and Woodhead, A. E., CXVII-Aniline-black and Allied Compounds, Part II", J. Chem. Soc. 101, pp. 1117 (1912) and in Kobayashi, et al., "Electrochemical Reactions . . . of Polyaniline Film-Coated Electrodes", J. Electroanal. Chem., 177. pp. 281–91 (1984).

Figure 2:
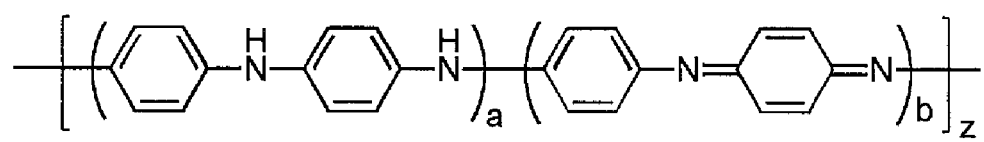
FIG. 2 is a diagram illustrating the general formula structure for a unsubstituted polyaniline in formula (I), the reactive chemical reagents in formula (II)–(VII), and the aniline monomers used for preparing polyanilines in formula (VIII), as used in implementing a preferred embodiment of the method according to the present invention.
Figure 2:
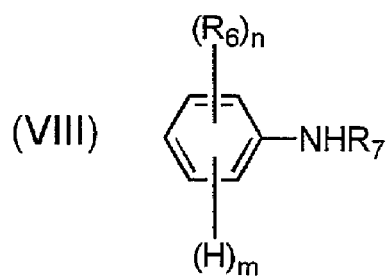

According to preferred embodiments of the present invention, polyanilines are homopolymers and copolymers of the type derived from the polymerization of unsubstituted and substituted anilines of the Formula VIII in FIG. 2, wherein:

n is an integer from 0 to 5;

m is an integer from 0 to 5, with the proviso that the sum of n and m is equal to 5 and with the further proviso that at least one position on the aniline ring, preferably at the para position, is substituted with a substituent which will allow coupling of the aniline units, such as halogen, hydrogen or other leaving group;

$R_6$ is the same or different at each occurrence and is selected from the group consisting of deuterium, alkyl alkenyl, alkynyl, alkenynyl, aryl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, alkylaryl, arylalkyl, halo, hydroxyl, cyano, nitro, alkylsilane, amino, amido, arylamino, diarylamino, alkylamino, dialkylamino, alkylarylamino, alkoxyalkyl, aryloxyalkyl, alkoxycarbonyl, heterocyclic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate, acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters, and the like; or any of the foregoing aromatic or heteroaromatic or aliphatic or cycloaliphatic groups substituted with one or more acid functional groups, such as sulfonic acid, carboxylic acid, phosphonic acid, phosphoric acid, phosphinic acid, sulfinic acid, and the derivatives thereof, such as salts, esters, and the like; or any of the foregoing aromatic or heteroaromatic or aliphatic or cycloaliphatic groups substituted with one or more the functional groups selected from the group consisting of heterocyclic ring, heteroaromatic ring, alkoxy, aryloxy, alkanoyloxy, aryloyloxy, alkylthio, arylthio, arylamino, diarylamino, alkylamino, dialkylamino, alkylarylamino, halo, amino, nitro, hydroxyl, mercapto, cyano, or epoxy moieties; or any two $R_6$ groups together, or any $R_6$ group together with any $R_7$ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, ester, carbonyl, sulfonyl, or oxygen atoms wherein permissible substituents are one or more halo, nitro, amino, alkylamino, dialkylamino, arylamino, diarylamino, alkylarylamino, cyano, epoxy moieties, or acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters, and the like; or $R_6$ is an aliphatic moiety having repeat units of the formula:

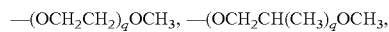
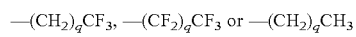

wherein q is a positive whole number; and $R_7$ is the same or different at each occurrence and is selected from a group consisting of permissible $R_6$ subsituent or hydrogen.

Illustrative of useful $R_6$ groups are hydrogen, alkyl, such as methyl, ethyl, octyl, nonyl, tert-butyl, neopentyl, isopropyl, sec-butyl, dodecyl and the like; alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoyl such as butanoyl, pentanoyl, octanoyl, ethanoyl, propanoyl and the like; amino; alkylamino, such as methylamino, ethylamino, butylamino and the like; dialkylamino, such as dimethylamino, methylethylamino and the like; arylamino such as phenylamino, p-methylphenylamino and the like; diarylamino, such as diphenylamino, p-nitrophenyl-p'-methylphenylamino and the like; alkylarylamino, such as 2-phenyl-4-methylamino and the like; alkylsulfinyl, alkylsulfonyl, alkylthio, arylthio, arylsulfinyl, and arylsulfonyl such as butylthio, neopentylthio, methylsulfinyl, benzylsulfinyl, phenylsulfinyl, propylthio, octylthio, nonylsulfonyl, octylsulfonyl, methylsulfonyl, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; cycloalkyl such as cyclohexyl, cyclopentyl, cyclooctyl, cycloheptyl and the like; alkoxyalkyl such as methoxymethyl, ethoxymethyl, butoxymethyl, propoxyethyl, pentoxybutyl and the like; aryloxyalkyl and aryloxyaryl such as phenoxyphenyl, phenoxymethyl and the like; and various substituted alkyl and aryl groups such as 1-hydroxybutyl, 1-aminobutyl, 1-hydroxypropyl, 1-hydroxypentyl, 1-hydroxyoctyl, 1-hydroxyethyl, 2-nitroethyl, trifluoromethyl, 3,4-epoxybutyl, cyanomethyl, 3-chloropropyl, 4-nitrophenyl, 3-cyanophenyl, and the like; acid and acid salts such as sulfonic acid, carboxylic acid and salts thereof; aliphatic or aryl groups substituted with an acid or salt thereof such as phosphonic acid, phosphinic acid, sulfonate salt, sulfinate salt, sulfonic acid, sulfinic acid, borate salt, phosphoric acid, boric acid, or carboxylic acid groups such as ethylsulfonic acid, propylsulfonic acid, 4-nitrobenzene sulfonic acid, butylsulfonic acid, phenylsulfonic acid, and the like.

Also illustrative of useful $R_6$ groups are divalent moieties derived from any two $R_6$ groups, or a $R_6$ group with a $R_7$, group such as moieties having from about 2 to about 7 repeat units of the formula:

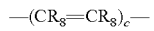

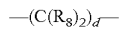

wherein $R_8$ is the same or different at each occurrence and is hydrogen or alkyl, as for example —(CH$_2$)$_4$—, —(CH$_2$)$_3$—, —(CH═CH—CH═CH)—, —(CH$_2$—CH(CH$_3$)—CH$_2$)— and —(CH$_2$)$_5$—, and groups comprised of such moieties which include one or more heteroatoms of oxygen, nitrogen, ester, sulfonyl, carbonyl, sulfinyl, and/or sulfur, such as —CH$_2$SCH$_2$—, —CH$_2$NHCH$_2$—, —SCH$_2$NHCH$_2$—, —O—CH$_2$—CH$_2$O—C(O)$_2$—CH$_2$—S—CH$_2$—, —CH$_2$S(O)$_2$CH$_2$—, —CH$_2$S(O)CH$_2$—, —OC(O)CH$_2$CH$_2$—, —CH$_2$C(O)CH$_2$— and —CH$_2$—O—CH$_2$— to form heterocyclic amino compounds such as tetrahydronaphthylamine, dihydrobenzopyrroleamine, benzofuranamine, dihydrobenzopyranamine, dihydrobenzofuranamine, dihydrobenzoparaoxazineamine, dihydrobenzoparadiazineamine, dihydrobenzotriazoleamine, dihydrobenzothiazineamine, benzothiopyranamine, dihydrobenzoxazoleamine and the like. Exemplary of useful $R_8$ groups are divalent alkenylene chains containing 1 to about 3 unsaturated bonds such as divalent 1,3-butadiene and like moieties which may also include one or more divalent oxygen, nitrogen, sulfinyl, sulfonyl, carbonyl, ester, and/or sulfur groups which form such compounds as benzodiazineamine, benzodiazoleamine, benzotriazepineamine, benzimidazolylamine, benzisoxazoleamine, benzoxazolylamine, benzothiazineamine, benzoxazineamine, naphthaleneamine, benzopyranamine, benzothiazineamine, anthraceneamine, aminobenzothiopyran, aminobenzodiazine, benzthiopyroneamine, aminocoumarin, benzothiopheneamine, benzothiodiazoleamine, and the like.

Exemplary of useful $R_7$ groups are hydrogen and the above-referenced representative $R_6$ groups described above such as alkyl as for example, methyl, ethyl, isopropyl, butyl, isobutyl, hexyl, octyl and the like; alkylsulfonyl such as methylsulfonyl, ethylsufonyl, propylsulfonyl and the like; arylsulfonyl such as phenylsulfonyl, p-methylphenylsulfonyl, naphthylsulfonyl and the like.

Preferred polyanilines for use in the practice of the present invention are those of the type derived from aniline of the above Formulas VIII in FIG. 2, or is a derivative of the polyaniline, wherein:

n is an integer from 0 to about 2;

m is an integer from 2 to 4, with the proviso that the sum of n and m is equal to 4;

$R_6$ is the same or different at each occurrence and is selected from the group consisting of deuterium, alkyl, alkenyl, alkynyl, alkenynyl, aryl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, alkylaryl, arylalkyl, halo, hydroxyl, cyano, nitro, alkylsilane, amino, amido, arylamino, diarylamino, alkylamino, dialkylamino, alkylarylamino, alkoxyalkyl, aryloxyalkyl, alkoxycarbonyl, heterocyclic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate, acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters, and the like; or any of the foregoing aromatic or heteroaromatic or aliphatic or cycloaliphatic groups substituted with one or more acid functional groups, such as sulfonic acid, carboxylic acid, phosphonic acid, phosphoric acid, phosphinic acid, sulfinic acid, and the derivatives thereof, such as salts, esters, and the like; or any of the foregoing aromatic or heteroaromatic or aliphatic or cycloaliphatic groups substituted with one or more the functional groups selected from the group consisting of heterocyclic ring, heteroaromatic ring, alkoxy, aryloxy, alkanoyloxy, aryloyloxy, alkylthio, arylthio, arylamino, diarylamino, alkylamino, dialkylamino, alkylarylamino, halo, amino, nitro, hydroxyl, mercapto, cyano, or epoxy moieties; or any two $R_6$ groups together, or any $R_6$ group together with any $R_7$ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, ester, carbonyl, sulfonyl, or oxygen atoms wherein permissible substituents are one or more halo, nitro, amino, alkylamino, dialkylamino, arylamino, diarylamino, alkylarylamino, cyano, epoxy moieties, or acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters, and the like; and $R_7$ is the same or different at each occurrence and is selected from a group consisting of permissible $R_6$ substituent or hydrogen.

In particular preferred embodiments according to the present invention, the polyanilines are those of the type derived from head to tail polymerization of anilines of the above Formula VIII in FIG. 2 or derivatives of the polyanilines, in which:

n is an integer from 0 to 1;

m is an integer from 3 to 4, with the proviso that the sum of n and m is equal to 4;

$R_6$ is the same or different at each occurrence and is selected from the group consisting of deuterium, alkyl, alkenyl, alkynyl, alkenynyl, aryl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, alkylaryl, arylalkyl, halo, hydroxyl, cyano, nitro, alkylsilane, amino, amido, arylamino, diarylamino, alkylamino, dialkylamino, alkylarylamino, alkoxyalkyl, aryloxyalkyl, alkoxycarbonyl, heterocyclic ring, heteroaromatic ring, alkylsulfinyl, arylsulfinyl alkylsulfonyl, arylsulfonyl, alkylsulfinylalkyl, alkylsulfonylalkyl, alkylcarboxylate, alkylsulfinate, alkylsulfonate, alkylphosphonate, acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof such as esters, and the like; or any of the foregoing aromatic or heteroaromatic or aliphatic or cycloaliphatic groups substituted with one or more acid functional groups, such as sulfonic acid, carboxylic acid, phosphonic acid, phosphoric acid, phosphinic acid, sulfinic acid, and the derivatives thereof, such as salts, esters, and the like; or any of the foregoing aromatic or heteroaromatic or aliphatic or cycloaliphatic groups substituted with one or more the functional groups selected from the group consisting of heterocyclic ring, heteroaromatic ring, alkoxy, aryloxy, alkanoyloxy, aryloyloxy, alkylthio, arylthio, arylamino, diarylamino, alkylamino, dialkylamino, alkylarylamino, halo, amino, nitro, hydroxyl, mercapto, cyano, or epoxy moieties; or any two $R_6$ groups together, or any $R_6$ group together with any $R_7$ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, ester, carbonyl, sulfonyl, or oxygen atoms wherein permissible substituents are one or more halo, nitro, amino, alkylamino, dialkylamino, arylamino, diarylamino, alkylarylamino, cyano, epoxy moieties, or acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters, and the like; and $R_7$ is the same or different at each occurrence and is selected from a group consisting of permissible $R_6$ substituent or hydrogen.

The following listed substituted- and unsubstituted- anilines are illustrative of those which can be used in the practice of the present invention.

| | |
|---|---|
| 2-Cyclohexylaniline | 2-Acetylaniline |
| Aniline | 2,5-Dimethylaniline |
| o-Toluidine | 2,3-Dimethylaniline. |
| 4-Propanoylaniline | N,N-Dimethylaniline |
| 2-(Methylamino)aniline | 4-Benzylaniline |
| 2-(Dimethylamino)aniline | 4-Aminoaniline |
| 2-Methyl-4-methoxy- carbonylaniline | 2-Methylthiomethylaniline |
| | 4-(2,4-Dimethylphenyl) aniline |
| 4-Carboxyaniline | 2-Ethylthioaniline |
| N-Methyl aniline | N-Methyl-2,4-dimethylaniline |
| N-Propyl aniline | N-Propyl-m-toluidine |
| N-Hexyl aniline | N-Methyl-o-cyanoaniline |
| m-Toluidine | 2,5-Dibutylaniline |

-continued

| | |
|---|---|
| o-Ethylaniline | 2,5-Dimethoxyaniline |
| m-Ethylaniline | Tetrahydronaphthylamine |
| o-Ethoxyaniline | o-Cyanoaniline |
| m-Butylaniline | 2-Thioacetylaniline |
| m-Hexylaniline | 2,5-Dichloroaniline |
| m-Octylaniline | 3-(n-Butanesulfonic acid) |
| 4-Bromoaniline | aniline |
| 2-Bromoaniline | 3-Propoxymethylaniline |
| 3-Bromoaniline | 2,4-Dimethoxyaniline |
| 3-Acetamidoaniline | 4-Mercaptoaniline |
| 4-Acetamidoaniline | 4-Ethylthioaniline |
| 5-Chloro-2-methoxy-aniline | 3-phenoxyaniline |
| 5-Chloro-2-ethoxy-aniline | 4-phenoxyaniline |
| N-Hexyl-m-toluidine | N-Octyl-m-toluidine |
| 4-Phenylthioaniline | 4-Trimethylsilylaniline |
| 3-Amino-9-methylcarbazole | 3-Aminocarbazole |
| 4-Aminocarbazole | N-(p-Aminophenyl) aniline |

Figure 3:
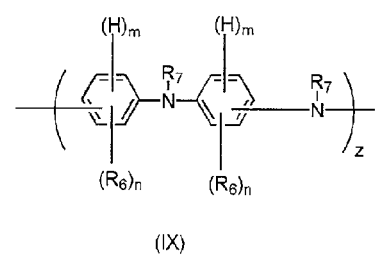
FIG. 3 is a diagram illustrating the polyanilines used in implementing a preferred embodiment of the method according to the present invention.
Figure 3:
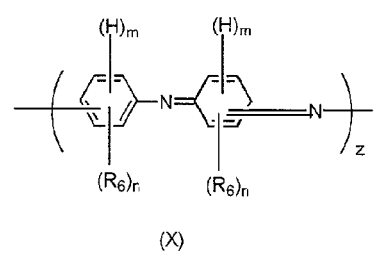
Figure 3:
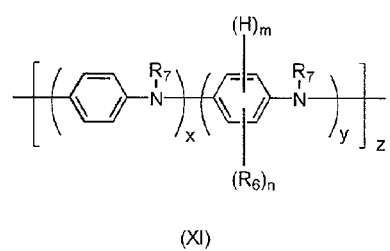
Figure 3:
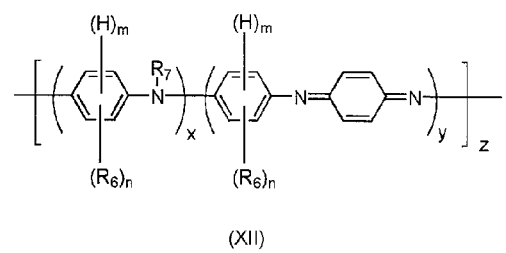
Figure 3:
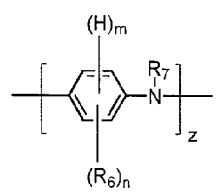
Figure 3:
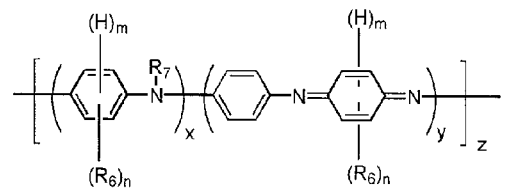

In the various embodiments of the present invention, the polyaniline used herein consists of repeat units of the Formulas IX or X of FIG. 3, or a combination thereof having various ratios of the above repeat units in the polyaniline backbone such as leucoemeraldine, protoemeraldine, emeraldine, nigraniline and pernigraniline.

Illustrative of the preferred polyanilines useful in the practice of the present invention are those of the Formulas XI to XV of FIG. 3, wherein:

n, m, $R_6$, and $R_7$ are as described above;

x and y are the same or different at each occurrence and are integers equal to or greater than 0, with the proviso that the sum of x and y is greater than 0, preferably where x is an integer equal to or greater than 0 and/or that the ratio of x to y is greater than or equal to about 0; and z is the same or different at each occurrence and is an integer equal to or greater than 1.

Preferred for use in the practice of the present invention are polyanilines of the above Formulas XI to XIV in FIG. 3, wherein:

n is an integer from 0 to about 3;

m is an integer from 1 to 4, with the proviso that the sum of n and m is equal to 4;

$R_6$ is the same or different at each occurrence and is selected from the group consisting of deuterium, alkyl, alkenyl, alkynyl, alkenynyl, aryl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, alkylaryl, arylalkyl, halo, hydroxyl, cyano, nitro, alkylsilane, amino, amido, arylamino, diarylamino, alkylamino, dialkylamino, alkylarylamino, alkoxyalkyl, aryloxyalkyl, alkoxycarbonyl, heterocyclic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate, acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters, and the like; or any of the foregoing aromatic or heteroaromatic or aliphatic or cycloaliphatic groups substituted with one or more acid functional groups, such as sulfonic acid, carboxylic acid, phosphonic acid, phosphoric acid, phosphinic acid, sulfinic acid, and the derivatives thereof, such as salts, esters, and the like; or any of the foregoing aromatic or heteroaromatic or aliphatic or cycloaliphatic groups substituted with one or more the functional groups selected from the group consisting of heterocyclic ring, heteroaromatic ring, alkoxy, aryloxy, alkanoyloxy, aryloyloxy, alkylthio, arylthio, arylamino, diarylamino, alkylamino, dialkylamino, alkylarylamino, halo, amino, nitro, hydroxyl, mercapto, cyano, or epoxy moieties; or any two $R_6$ groups together, or any $R_6$ group together with any $R_7$ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, ester, carbonyl, sulfonyl, or oxygen atoms wherein permissible substituents are one or more halo, nitro, amino, alkylamino, dialkylamino, arylamino, diarylamino, alkylarylamino, cyano, epoxy moieties, or acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters, and the like; and $R_7$ is the same or different at each occurrence and is selected from a group consisting of permissible $R_6$ subsituent or hydrogen, x and y are the same or different at each occurrence and are integers equal to or greater than 0, with the proviso that the sum of x and y is greater than 0, preferably where x is an integer equal to or greater than 0 and/or that the ratio of x to y is greater than or equal to about 0; and z is the same or different at each occurrence and is an integer equal to or greater than 1.

Particularly preferred for use in the practice of this invention are polyanilines of the above Formulas XI to XIV in FIG. 3, wherein:

n is an integer from 0 to 2;

m is an integer from 2 to 4, with the proviso that the sum of n and m is equal to 4;

$R_6$ is the same or different at each occurrence and is selected from the group consisting of deuterium, alkyl alkenyl, alkynyl, alkenynyl, aryl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, alkylaryl, arylalkyl, halo, hydroxyl, cyano, nitro, alkylsilane, amino, amido, arylamino, diarylamino, alkylamino, dialkylamino, alkylarylamino, alkoxyalkyl, aryloxyalkyl, alkoxycarbonyl, heterocyclic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate, acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters, and the like; or any of the foregoing aromatic or heteroaromatic or aliphatic or cycloaliphatic groups substituted with one or more acid functional groups, such as sulfonic acid, carboxylic acid, phosphonic acid, phosphoric acid, phosphinic acid, sulfinic acid, and the derivatives thereof, such as salts, esters, and the like; or any of the foregoing aromatic or heteroaromatic or aliphatic or cycloaliphatic groups substituted with one or more the functional groups selected from the group consisting of heterocyclic ring, heteroaromatic ring, alkoxy, aryloxy, alkanoyloxy, aryloyloxy, alkylthio, arylthio, arylamino, diarylamino, alkylamino, dialkylamino, alkylarylamino, halo, amino, nitro, hydroxyl, mercapto, cyano, or epoxy moieties; or any two $R_6$ groups together, or any $R_6$ group together with any $R_7$ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, ester, carbonyl, sulfonyl, or oxygen atoms wherein permissible substituents are one or more halo, nitro, amino, alkylamino, dialkylamino, arylamino, diarylamino, alkylarylamino, cyano, epoxy moieties, or acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters, and the like; and $R_7$ is the same or different at each occurrence and is selected from a group consisting of permissible $R_6$ subsituent or hydrogen; and x and y are the same or different at each occurrence and are integers equal to or greater than 0, with the proviso that the sum of x and y is greater than 0, preferably where x is an integer equal to or greater than 0 and/or that the ratio of x to y is greater than or equal to about 0; and z is the same or different at each occurrence and is an integer equal to or greater than 1.

In general, the number of repeat units in polyaniline homopolymers or copolymers is not critical and may vary widely. The greater the number of repeat units the greater the viscosity and molecular weight of the polyaniline homopolymer or copolymer. In those applications where a polyaniline homopolymer or copolymer of relatively low molecular weight and viscosity is required, such materials may be used, and in those applications where a conjugated backbone homopolymer or copolymer of relatively high molecular weight and viscosity is required, then such materials can be used. The number of repeat units is at least about 10. The upper limit can vary widely depending on the desired molecular weight and viscosity and the required degree of processability, such as the processibility, solution processibility and the like. In the preferred embodiments of the invention, the number of repeat units is at least about 20, and in the particularly preferred embodiments, the number of repeat units is at least about 30. Amongst the particularly preferred embodiments, most preferred are those embodiments in which the number of repeat units is at least about 40.

Polyaniline homopolymers and copolymers can be conveniently prepared through conventional procedures. Such procedures are well known in the art and will not be described herein in great detail. See, for example, E. M. Genies, A. Boyle, M. Lapkowski and C. Tsintavis, Synthetic Metals, 1990, 36, 139. The polyanilines can be prepared through use of any chemical or electrochemical synthetic procedures known in the art. For example, one form of polyaniline can be prepared by treating aniline with ammonium persulfate $(NH_4)_2S_2O_8$ in excess 1M HCl. This powdered form of polyaniline is blue green in color. After methanol washing and air drying this material exhibits a conductivity of about 5 S/cm. This conductive form of polyaniline can be treated with ammonium hydroxide in ethanol to form a non-conductive form of polyaniline which is purple in color and has a conductivity of less than $10^{-10}$ S/cm. Other chemical procedures for preparation of various chemical forms of polyaniline are described in detail in Green et al, cited herein.

Useful forms of polyaniline can also be prepared electrochemically. For example, useful forms of polyaniline can be prepared by an electrochemical oxidation of aniline in aqueous fluoroboric acid electrolyte on a platinum foil anode.

Other chemical and electrochemical syntheses and transformations of polyaniline may be discovered and are presently contemplated as being useful. Moreover, additional forms or types of polyaniline may be elucidated in the future. Accordingly, no limitation to the syntheses, transformation, or structures herein described or postulated is intended beyond the limitations or equivalents of the appended claims.

The polyaniline homopolymer or copolymer, as used in this invention, can be either in the neutral undoped (non-conductive) form(s) or in the conductive and doped forms with various doping degrees.

In the case of conductive and doped forms, the polyaniline homopolymer or copolymer can be doped with a suitable dopant to render the polymer electrically conductive. Dopants for use in general can be such materials which are known in the art for use in doping conjugated backbone homopolymer or copolymers to form conductive or semi-conductive polymers, such as oxidizing dopants can be used. Illustrative of useful oxidizing dopants are $AsF_5$, $NO^+$ and $NO_2^+$ salts (such as $NOBF_4$, $NOPF_6$, $NOSbF_6$, $NOAsF_6$, $NO_2BF_4$, $NO_2PF_6$, $NO_2AsF_6$, $NO_2SbF_6$, and the like), $HClO_4$, $HNO_3$, $H_2SO_4$, $SO_3$, $I_2$, and Fe(III) salts (such as $FeCl_3$, $Fe(OTs)_3$, $Fe(CF_3SO_3)_3$, and the like). Illustrative of other dopants includes protonic acid dopants. Such dopants include inorganic acids, such as hydrofluoric acid, hydroiodic acid, phosphoric acid, nitric acid, boric acid, sulfuric acid and the like other protonic acid dopants are organic acids, such as aryl or alkyl compounds containing sulfonic acid, sulfinic acid, carboxylic acid, phosphonic acid, phosphinic acid, or boric acid moieties.

The amount of dopant added to the conjugated backbone homopolymer or copolymer coating the particle is not critical and may vary widely. In general, sufficient dopant is added to the homopolymer or copolymer to at least form doped polymer that is a semi-conductor, which has a conductivity of at least about $10^{-12}$ $ohm^{-1} cm^{-1}$. The upper level of conductivity is not critical and depends on the type of homopolymer or copolymer employed. In general, for those applications utilizing the conductivity property, the highest level of conductivity obtained is provided without unduly adversely affecting the environmental stability of the conjugated backbone homopolymer or copolymer. In the various embodiments of the present invention, the amount of dopant employed is sufficient to provide a conductivity of at least about $10^{-9}$ $ohm^{-1} cm^{-1}$. In particularly preferred embodiments according to the present invention, the amount of dopant is sufficient to provide a conductivity of about $10^{-3}$ $ohm^{-1} cm^{-1}$ to about $10^{+2}$ $ohm^{-1} cm^{-1}$. The blend prepared according to the present invention can be used for any purpose for which polymer blends are useful. For example, where such blends are electrically conductive, they can be used in the fabrication of articles that comprise electrically conductive portions and electrically non-conductive portions, and articles that are completely electrically conductive. Examples of such articles include electrically conductive polymer housings for EMI shielding of sensitive electronic equipment such as microprocessors; infrared, radio frequency and microwave absorbing shields; flexible electrical conducting connectors; conductive bearings and brushes; semiconducting photoconductor junctions; electrodes; capacitors; optically transparent or non-transparent corrosion-preventing coatings for corrodible materials such as steel; antistatic materials and optically transparent or non-transparent coatings for packaging electronic components; carpet fibers; waxes for floors in computer rooms; antistatic finishes for CRT screens, aircraft, and auto windows, and the like.

Various other applications for the conducting coatings produced according to the present invention include applications such as conducting plastic gas tanks; solar window coatings; transparent electrical elements for heated windows and heated liquid crystal displays; electrochromic displays, electrical contacts for electroluminescent displays and electroluminescent lights, and electrical contacts for piezoelectric films for transparent loud speakers; transparent conducting coatings for windows in burglar alarm systems; membrane coatings for chemical separations (such as $O_2$ and $N_2$, for example), and conducting coatings for membrane switches, and a discharge layer or photoresist layer for lithographic process. The following specific examples are presented to more particularly illustrate the present invention, and should not be construed as being limitations on the scope and spirit of the present invention.

Example I

Polyaniline powder is prepared by a chemical means by the following procedure. Aniline (50 g, 0.54 mole) and 204.4 g of p-toluenesulfonic acid monohydrate (1.08 mole, Aldrich Chemical) are dissolved in 1750 mL of $H_2O$ in a three neck round bottom flask equipped with a mechanical stirrer and an addition funnel. After the reaction mixture is cooled to 15° C., an aqueous solution of ammonium persulfate (157 g in 270 mL $H_2O$) is added dropwise through the addition funnel. The overall addition time was 2 h and 50 min. After the addition is finished, the reaction mixture is stirred for another 30 min.

The resultant solid is collected by filtration. The filtration cake is then dispersed and stirred for 30 min in 1.5 L of a 12 wt % aqueous solution of p-toluenesulfonic acid for four times. Each time, the solid is re-collected and then re-dispersed into a fresh p-toluenesulfonic acid solution.

After the above treatment, the filter cake is then dispersed and stirred for 30 min in 1.5 L of 8 wt % methanol solution of p-toluenesulfonic acid for two times. Each time, a fresh p-toluenesulfonic acid is used. The final filter cake is dried at 25° C. in air for 15 h and then at 80° C. under dynamic vacuum for 3 h.

Yield for the above toluenesulfonic acid doped polyaniline was 83 g, and elemental analysis (wt %) is C(63.17), H(4.99), N(8.30), S(8.88), O(13.87).

Example II

The undoped neutral polyaniline powder is prepared from the above p-toluenesulfonic acid doped polyaniline (i.e., poly(anilinium tosylate)) by dedoping with a base as described in the following. Poly(anilinium tosylate) (50 g) obtained in Example I is suspended in 500 mL. $H_2O$ and stirred with 30 g of sodium carbonate at ambient temperature for 20 h. The resulting solid is collected by filtration and rinsed with 2 L of deionized water. The filter cake is dispersed in 1.5 L of deionized water and stirred for 4 h to remove sodium carbonate residue. The solid is then re-collected by filtration and rinsed with 2 L of deionized water. The resulting filter cake is air-dried at 25° C. for 20 h and then vacuum-dried at 80° C. for 3 h.

The elemental analysis results showed that the sample is free of dopant (S<0.03 wt %) and sodium carbonate (Na, non-detectable).

Example III

A freestanding film of about 10 μm (±2 μm) thick can be prepared from a NMP (N-methylpyrrolidinone) solution of the neutral polyaniline powder as prepared in Example II by the following procedure. A 0.48 wt % blue solution of polyaniline is prepared by dissolving the above dedoped polyaniline powder about 0.1 g in 25 mL NMP. After filtered off some small amount of insoluble solid, the resulting solution is cast into freestanding films on cleaned glass slides (7.5×2.5 cm in size), by carefully placing about 1.5–2.0 mL solution on each slide and pumping to dryness in a vacuum oven for about 24 h. A blue film with metallic shining is then formed, which can be peeled off by immersing the coated glass slide in methanol for 2–3 h.

Example IV

A polyaniline coating of about 0.5 μm thick can be similarly prepared from the same polyaniline solution in Example III by casting a much smaller amount of solution on a conductive ITO (Indium Tin Oxide) glass or a plate of stainless steel.

Example V

A polyaniline film (or coating) can be grown on a platinum electrode via an electrochemical means using a 0.1 M aniline solution by the following procedure.

The growth of polyaniline thin films are conducted in a three-electrode electrochemical cell, using platinum plates or wires as both the working and counter electrodes and a saturated calomel electrode (SCE) as the reference electrode. All the polymerization reactions are controlled by a potentiostat (EG&G 273) under a constant current density of $13.3 \times 10^{-6}$ $A/cm^2$ for 25 minutes, in a 0.5 M $H_2SO_4$ aqueous solution that contains 0.1 M aniline. The thickness of the polyaniline film thus obtained (of about 80–100 nm) is measured by SIMS (secondary ion mass spectroscopy) depth-profiling and an α-step.

Example VI

Polyaniline films were first grown on a Pt working electrode by the procedure in Example V. The oxidation state of the resulted polyaniline films on electrode is further controlled by forcing it at 0.5 V vs. SCE (saturated calomel electrode) for 10 minutes using the same electrochemical equipment in a fresh 0.5 M aqueous solution of $H_2SO_4$. The resulting polyaniline coated electrodes are then cleaned by first dipping in deionized water (to remove anilinium hydrogen sulfate residue), followed by methanol (to remove the water residue), before being soaked in 0.2 M methanolic solutions dodecan-1-thiol for a defined reaction time.

On completion of the desired reaction period, these soaked polyaniline electrodes are cleaned and dedoped quickly by dip-washing in a series of solvents or solution in the following sequence: methanol (to remove dodecane-1-thiol residue), 5 wt % aqueous sodium carbonate (for 2 minutes to remove hydrogen sulfate dopant residue), deionized water (to remove $Na_2CO_3$ residue), and acetone (to remove the water residue). The treated polyaniline coated electrodes are then dried with nitrogen gas and inspected immediately by attenuated total reflectance infrared (ATRIR) spectroscopy, using a Perkin Elmer 2000 FTIR spectrometer equipped with a Graseby Specac single reflection diamond ATR accessory under a nitrogen atmosphere.

The ATRIR spectra show that as soaking time increased, a clear trend of intensity reduction at 1600 $cm^{-1}$ (C=C stretching vibration of diiminoquinoid rings), 1169 $cm^{-1}$ (a vibration mode associated with the diiminoquinoid ring) and 820 $cm^{-1}$ (C—H out-of-plane vibration on 1,4-ring) can be observed. Similar intensity reduction of these three peaks has also been observed when polyaniline emeraldine base is reduced by hydrazine to leucoemeraldine base. These results indicate that the resultant polyaniline films are reduced to different extents when soaked in dodecane-1-thiol. The degree of reduction increases with the soaking time and reaches a saturation level after about 60 minutes. The ATRIR spectra also show the appearance of new $sp^3$ C—H stretching peaks at 2928 and 2850 $cm^{-1}$ whose intensities increase at the same pace with that of the C=C stretching for benzenoid rings at about 1500 $cm^{-1}$. The presence of the new dodecylthio substituent in the resulting polyaniline film is also confirmed by x-ray photoelectron spectroscopy (XPS). In addition to the original C 1s (with a binding energy of 284.6 eV) and N 1s (399.2 eV) lines, the XPS survey spectrum of the dodecane-1-thiol treated film show a new S 2p line at 163.5 eV, indicating the formation of the sulfide linkage (but not disulfide or thiol).

Example VII

An advantage of using the method according to the present invention is that a functionalized polyaniline film as prepared in Example VI can be re-oxidized to any desirable oxidation states to repeat the concurrent reduction and substitution chemistry, thus further enhance the degree of substitution on the polyaniline backbone. The feasibility of the above has been demonstrated, by first preparing an electrode coated with a polyaniline film (polymerized for 25 minutes) and then soaking in a 0.1 M methanolic dodecane-1-thiol solution for 60 minutes. The modified polyaniline on the electrode is re-oxidized in a 0.5 M aqueous solution of $H_2SO_4$ electrochemically, using a potential difference of 0.5 V (vs. SCE or saturated calomel electrode) for 5 minutes, until the oxidation current approached to zero. It is finally soaked in a 0.1 M methanolic solution of dodecane-1-thiol again for 60 minutes to undergo another run of concurrent reduction and substitution chemistry. The above reaction cycle can be repeated as many times as one desires.

The ATRIR spectra of the polyaniline film that had undergone 1 to 3 cycles of oxidation and reaction (60 minutes in each cycle) with a 0.1 M methanolic solution of dodecane-1-thiol clearly show that the relative intensity of the $sp^3$ C—H peaks (at 2850 and 2928 $cm^{-1}$) to that for the benzenoid rings (at around 1500 $cm^{-1}$) increase with the number of reaction cycles, confirming the increase of the degree of substitution. Results from XPS studies on polyaniline films subjected to different number of cycle of treatments also indicate that the intensity of the S $2p_{3/2}$ lines (at ca. 163.5 eV) increase with the reaction cycles relative to that of the N 1s lines (at ca. 400 eV). The degrees of substitution measured by the atomic ratio of S/N for the polyaniline films resulted from the first, the second, and the third reaction cycle are equal to 24.7%, 38.8%, and 46.1%, respectively. The polyaniline resulted from the third reaction cycle containing 46.1 mol % (based on polyaniline repeat units) is found to be completely soluble in THF, which is, however, a non-solvent for the original unsubstituted parent polyaniline.

Example VIII

Such cyclic process of concurrent reduction and substitution with electrochemical re-oxidation steps can be further utilized to enhance the functionality of polyanilines, by introducing more than one type of substituents in a sequential manner to the same polyaniline backbone. This enhancement is performed by first treating the as-synthesized polyaniline electrode at 0.5 V for 5 minutes, followed by sequential soaking treatments (60 minutes each) with 0.1 M solutions of mercaptoethanesulfonic acid, dodecane-1-thiol, and mercaptoacetic acid. The reduced polyaniline coated electrode is re-activated each time at 0.5 V for 5 minutes to regenerate the diiminoquinoid rings between different soaking treatments. The ATRIR spectra show a sequential appearance of the new $SO_3$ peaks at 1043 and 1219 $cm^{-1}$ indicating the presence of mercaptoethanesulfonic acid substituent, $Sp^3$ C—H peaks at 2928 and 2850 $cm^{-1}$ indicating the presence of dodecylthio substituent, and C=O peaks at 1703 and 1580 $cm^{-1}$ indicating the presence of mercaptoacetic acid substituent, from the treated polyaniline film. This is similar to the reaction sequence of adding mercaptoacetic acid, dodecylthio, and mercaptoacetic acid functional groups onto the polyaniline backbone, in different cycles of treatment.

Example IX

A free-standing polyaniline film of about 10 μm thick prepared in Example III is soaked with a 0.1 M methanolic solution of mercaptopropanesulfonic acid sodium salt (MPS-Na) for 6 h. A catalytic amount of protonic acid, e.g., 0.01 M acetic acid, is added to promote the reaction rates. The resulted polyaniline film is thoroughly rinsed and soaked with methanol (to remove any MPS-Na residue), followed by soaking in 5% aqueous $Na_2CO_3$ (to remove the acetic acid catalyst and/or any non-bonded 3-mercapto-1-propanesulfonic acid residue), deionized $H_2O$ (to remove $Na_2CO_3$), and acetone (to remove $H_2O$), before being blown dried with nitrogen gas to remove the cleaning solvents. After the treatment with MPS-Na, the polyaniline backbone is found to be highly reduced and substituted with alkylthio groups that contain a sulfonic acid moiety Similar reaction pattern has also been observed when polyaniline is treated with other thiols. The reduction and substitution phenomena in the MPS-Na treated films are confirmed by attenuated total reflectance infrared (ATRIR) spectroscopy. The ATRIR spectrum of the resulting polyaniline film show reduction in the intensities of the peaks associated with diiminoquinoid rings at 1600 $cm^{-1}$ (C=C stretching vibration of diiminoquinoid rings), 1169 $cm^{-1}$ (a vibration mode associated with the diiminoquinoid ring) and 820 $cm^{-1}$ (C—H out-of-plane vibration of 1,4-ring). Similar intensity reduction of these three peaks has also been observed when polyaniline emeraldine base is reduced by hydrazine to leucoemeraldine base. The same ATRIR spectrum of the MPS-Na treated film also show the presence of new peaks at 1220 $cm^{-1}$ and 1041 $cm^{-1}$, attributable to the corresponding asymmetric and symmetric $SO_3$ stretching of the newly introduced 3-mercapto-1-propanesulfonic acid substituent (MPS-substituent). Also shown in the same IR spectrum are three small new peaks at about 2971, 2934 and 2876 $cm^{-1}$, which can be attributed to the asymmetric (2971, 2934 $cm^{-1}$) and symmetric (2876 $cm^{-1}$) —$CH_2$— stretching of the newly introduced MPS-substituent. Similar weak C—H stretching peaks for MPS-Na are observed at 2974, 2939 and 2860 $cm^{-1}$, with intensities less than one-tenth of that for its $SO_3$ asymmetric stretching peak at 1194 $cm^{-1}$.

The presence of the new sulfonic-acid-containing alkylthio substituent in the resulting polyaniline film is also shown by x-ray photoelectron spectroscopy (XPS). In addition to the original C 1s (with a binding energy of 284.6 eV) and N 1s (399.2 eV) lines, the MPS survey spectrum of the MPS-Na treated film show the newly appeared O 1s line at 531.5 eV and the S 2p lines at around 160–170 eV The more detailed S 2p chemical state spectrum for the same film indicate that there are two new S $2p_{3/2}$ lines at 163.5 eV and 167.6 eV, attributable to the sulfide linkage (but not disulfide or thiol) and the sulfonic acid end group, respectively.

The resulted polyaniline film is found to have a self-doping conductivity of 0.02 S/cm, in the absence of any external dopant. This self-doping conductivity is also found to be relatively insensitive to pH change in the range of 1–7, as expected for a typical self-doped polyaniline. Compared to the self-doping conductivity of ca. $10^{-5}$ S/cm for a previously reported sulfonated-polyaniline (at a slightly higher self-doping degree, i.e. 26 mol %), the unusually high conductivity of this new functionalized self-doping polyanilines (with a self-doping degree of only ca. 20 mol %) is especially worth noting.

The distribution of the mercaptopropanesulfonic acid substituent (i.e., propylthio sulfonate) within a polyaniline film is investigated by SIMS (secondary ion mass spectroscopy) utilizing a depth profiling study. The results clearly show that the S atom (with propylthio sulfonate substituent group being the only sulfur source) is distributed evenly throughout the thickness of this control polyaniline specimen. The substitution reaction is effectively performed within the solid state polyaniline matrix (about 10 μm thick), and thus the reaction is not limited to the surface of the film.

Example X

A polyaniline coating on a stainless steel plate as prepared by a typical solution casting method, as illustrated in Example IV, is soaked with a thiol containing two mercapto functional group, e.g. 1,2-ethanedithiol (or 1,3-propanedithiol, or 1,6-hexanedithiol) for 60 minutes at room temperature in air. The resulted polyaniline coating was found to form a highly cross-linked network as illustrated in the following scheme and become insoluble in DMF even under ultrasonic agitation for 30 min.

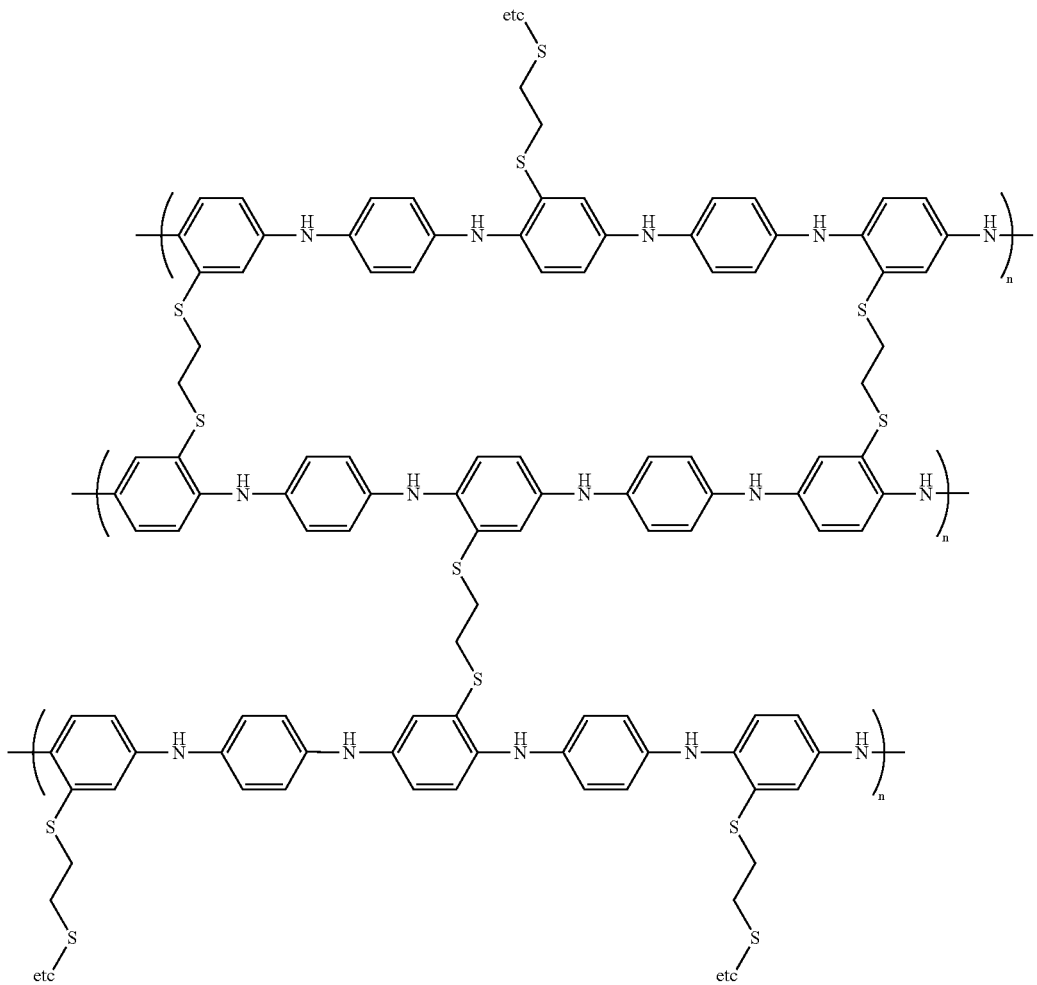

Furthermore, the resulting coating, whether doped or undoped, is not soluble in, or damaged by other organic solvents, like DMSO, NMP, piperidine, pyrrolidine, $CH_3NO_2$, MeOH, EtOH, THF, $CH_2Cl_2$, $CHCl_3$, $CH_3CN$, acetone, ethyl acetate, and hexane, etc. On the other hand, the untreated polyaniline coating is readily soluble in DMF, NMP, DMSO, piperidine, and pyrrolidine. The improved durability and weathering ability of the resultant polyaniline coating greatly improve the protection life and effectiveness of anti-corrosion applications.

Example XI

A polyaniline powder (0.5 g) prepared in Example II is suspended in a solvent mixture (40 mL) of NMP and $H_2O$ (v/v=1:1) which contains mercaptoethanesulfonic acid sodium salt (18.4 g; 0.11 mole) and acetic acid (0.31 mL, 5.4 mmole). The reaction mixture is stirred at room temperatures under $N_2$ atmosphere for two days. The resulting solid is collected by filtration, rinsed with copious amount of $H_2O$ to remove the residual thiol, then rinsed with methanol and acetone and dried under dynamic vacuum for about 24 hours. The resulted polyaniline is found, according to the results of elemental analysis and XPS, to be substituted with about 25 mol % of mercaptoethanesulfonic acid.

Example XII

A substituted polyaniline, polyanisidine, is prepared from a solution of anisidine monomer via an electrochemical oxidative polymerization method similar to that in Example V The resulting polyanisidine coated Pt electrode is then soaked for 14 hours in a 0.1 M aqueous solution of mercaptopropanesulfonic acid sodium salt containing 0.01 M aqueous solution of acetic acid as a catalyst. The resulting polyanisidine film is found by ATRIR and XPS spectroscopy to be highly reduced and concurrently substituted with about 20 mol % of propylthio sulfonate group.

Example XIII

A polyaniline coating on an ITO (indium-tin-oxide) glass plate as prepared by a typical solution casting method, as illustrated in Example IV, is soaked with a methanolic solution of o.1 M thiolacetic acid for 60 minutes at room temperature under a nitrogen atmosphere. The resultant functionalized polyaniline coating was found to become insoluble in DMF even under ultrasonic agitation for 30 min. Furthermore, the resulting film, whether doped or undoped, is not soluble in, or damaged by other organic solvents, like DMSO, NMP, piperidine, pyrrolidine, $CH_3NO_2$, MeOH, EtOH, THF, $CH_2Cl_2$, $CHCl_3$, $CH_3CN$, acetone, ethyl acetate, and hexane, etc. On the other-hand, the untreated polyaniline coating is readily soluble in DMF, NMP, DMSO, piperidine, and pyrrolidine. Although the exact structure of the resultant functionalized polyaniline is still unknown, the solubility test results imply that the treated polyaniline coating might have been converted to a highly cross-linked polyaniline network similar to those polyaniline coatings after being treated with an alkanedithiol as illustrated in Example X. Most interestingly, after subjecting to reoxidation (to an oxidation state of ca. 0.3 V) and doping (with $H_2SO_4$) treatments, this functionalized polyaniline was found, basing on the UV-visible-NIR spectroscopic results, to have a more delocalized polaron lattice structure than its parent unsubstituted polyaniline. These results further suggest that after the functionalization reaction a highly cross-linked polyaniline network with a higher degree of conjugation than the original unsubstituted polyaniline has been obtained.

Example XIV

A series of functionalized polyaniline films (ca. 10 μm thick) containing different amounts of butylthio functional group on the corresponding polymer backbones were prepared from one, two, and three cycles of reaction and redox treatments, following a similar procedure as illustrated in Example VII. In each reaction treatment cycle, the corresponding film of the unsubstituted polyaniline (for the first reaction cycle) or the butylthio-substituted polyanilines (for the second and third reaction cycles), in an oxidation state of ca. 0.5 V vs SCE, was soaked in a 0.1 M methanolic solution of butane-1-thiol for 14 h. The polyaniline film resulted from one, two, and three treatment cycles was found by XPS and elemental analysis to contain ca. 38, 91 and 121 mol % (basing on the aniline repeat unit) of butylthio functional group, respectively. After a redox treatment (to bring the resultant polyaniline to the same oxidation state of 0.3 V) and a doping treatment with $HClO_4$, the conductivity of these functionalized films was measured using a 4-in-line probe method to be 3–4, 1.0, and 0.6 S/cm, respectively. Compared to their alkoxy analogues, e.g. poly(butoxyaniline) ($2\times10^{-3}$ S/cm) and poly(dibutoxyaniline) ($7\times10^{-4}$ S/cm), the unusually high conductivity of these new butylthio-substituted polyanilines is especially worth noting.

While the present invention has been particularly shown and described with reference to the preferred embodiments thereof, the embodiments are not intended to be exhaustive or to limit the present invention to the precise forms disclosed herein. It will be understood by those skilled in the art that various changes in form and detail may be made therein without departing from the spirit and scope of the invention. Similarly, any process steps described may be interchangeable with other steps in order to achieve substantially the same result. The scope of the present invention is defined by the following claims and their equivalents.

What is claimed is:

1. A functionalized polyaniline comprises at least one type of the repeat units of the formulas XV to XX

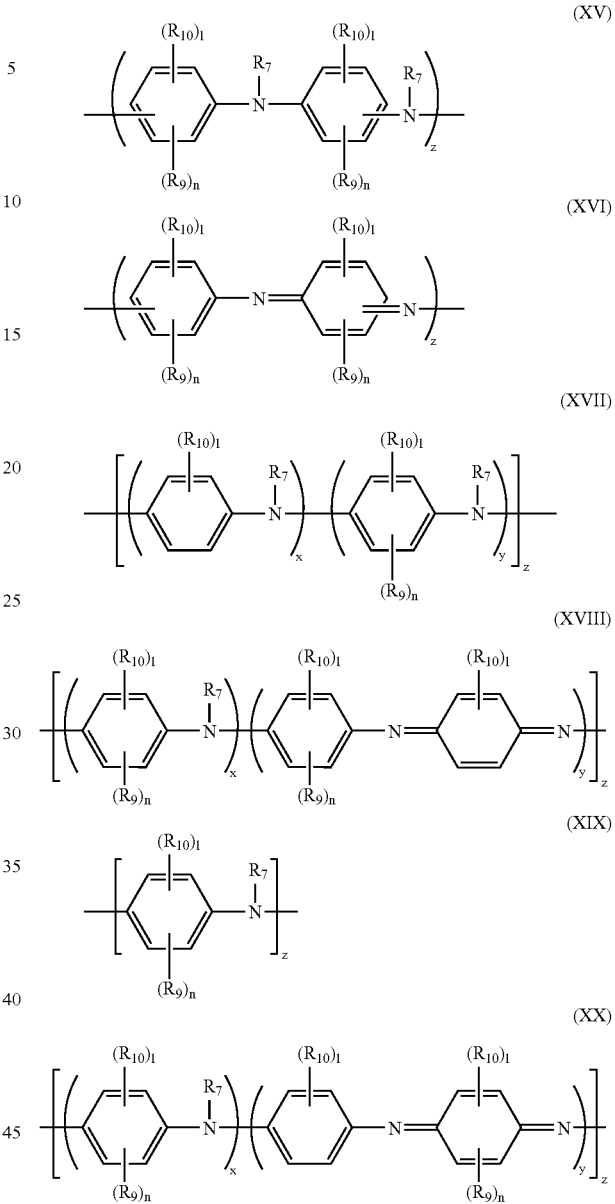

wherein:
x and y are the same or different at each occurrence and are integers equal to or greater than 0, with the proviso that the sum of x and y is greater than 0; and
z is the same or different at each occurrence and is an integer equal to or greater than 1,
n is the same or different at each occurrence and is an integer from 0 to about 4;
l is the same or different at each occurrence and is an integer from 0 to 4, with the proviso that at least one occurring l is not zero and with the further proviso that the sum of n and l at the same occurring repeat unit is equal to or less than 4;
$R_9$ is the same or different at each occurrence and is selected from the group consisting of hydrogen, deuterium, alkyl, alkenyl, alkynyl, alkenynyl, aryl, alkylaryl, arylalkyl, allyl, benzyl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkylthio, alkylthioarylthio, arylthioarylthio, alkanoylthio, aryloylthio, alkoxycarbonylthio, aryloxycarbonylthio, aryloxycarbonylthio, vinyloxycarbonylthio, alkenyloxycarbonylthio, allyloxycarbonylthio, benzyloxycarbonylthio, arylalkyloxycarbonylthio, alkylcarboxylthioalkoxy, arylcarboxylthioalkoxy, alkylcarbonylthioaryloxy, arylcarbonylthioaryloxy, alkoxycarboxylthioalkoxy, aryloxycarboxylthioalkoxy, alkyloxycarbonylthioaryloxy, aryloxycarbonylthioaryloxy, halo, hydroxyl, hydroxyalkyl, hydroxyaryl, cyano, nitro, alkylsilane, arylsilane, amino, aminoalkyl, aminoaryl, amido, amidoalkyl, amidoaryl, arylamino, diarylamino, alkylamino, dialkylamino, alkylarylamino, cycloalkylamino, alkyleneamino, alkylphosphine, dialkylphosphine, arylphosphine, diarylphosphine, alkylarylphosine, cycloalkylphosphine, alkylenephosphine, alkoxyalkyl, aryloxyalkyl, alkoxycarbonyl, aryloxycarbonyl, vinyloxycarbonyl, alkenyloxycarbonyl, allyloxycarbonyl, benzyloxycarbonyl, arylalkyloxycarbonyl, aryloxycarbonyloxy, alkoxycarbonyloxy, aryloxycarbonyloxy, heterocyclic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate, acid functional groups such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters; or any of the foregoing aromatic or heteroaromatic or aliphatic or cycloaliphatic groups substituted with one or more acid functional groups such as sulfonic acid, carboxylic acid, phosphonic acid, phosphoric acid, phosphinic acid, sulfinic acid, and the derivatives thereof, such as salts, esters; or any of the foregoing aromatic or heteroaromatic or aliphatic or cycloaliphatic groups substituted with one or more the functional groups selected from the group consisting or heterocyclic ring, heteroaromatic ring, alkyl, cycloalkyl, aryl, alkenyl, alkynyl, alkylene, arylene, alkenylene, alkynylene, alkoxy, aryloxy, alkanoyloxy, aryloyloxy, arylamino, diarylamino, alkylamino, dialkylamino, alkylarylamino, halo, amino, nitro, hydroxyl, cyano, hydroxyl, alkanoylthio, aryloylthio, alkoxycarbonylthio, aryloxycarbonylthio, alkylthio, arylthio, arylcarbonylthio, mercapto, epoxy moiety, or other permissible $R_9$ substituent; or any two $R_9$ groups together, or any $R_9$ group together with any $R_7$ group may form a substituted or unsubstituted alkylene or alkenylene or alkynylene chain completing a 3, 4, 5, 6, 7, 8, 9 or 10 membered aromatic or heteroaromatic or heteroalicyclic or alicyclic ring, which ring may optionally include one or more divalent nitrogen, sulfur, sulfinyl, ester, carbonyl, sulfonyl, selenium, tellurium, phosphorus or oxygen, wherein permissible substituents are one or more aromatic, heteroaromatic, heteroalicyclic or alicyclic ring, alkyl, aryl, alkenyl, alkynyl, alkylene, arylene, alkenylene, alkynylene, halo, nitro, amino, alkylamino, dialkylamino, arylamino, diarylamino, alkylarylamino, cyano, hydroxyl, alkanoylthio, aryloylthio, alkoxycarbonylthio, aryloxycarbonylthio, alkythio, arylthio, arylcarbonylthio, mercapto, epoxy moiety, or other permissible $R_9$ substituent, or acid functional group such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters; and $R_7$ is the same or different at each occurrence and is selected from a group consisting of permissible $R_9$ group; and $R_{10}$ is the same or different at each occurrence and is selected from hydrogen, or the functional groups consisting of substituted or unsubstituted alkylamino, arylamino, dialkylamino, diarylamino, alkylarylamino, cycloalkylamino, alkyleneamino, alkylphosphine, dialkylphosphine, arylphosphine, diarylphosphine, alkylarylphosine, cycloalkylphosphine, alkylenephosphine, alkylthio, arylthio, alkylthioalkylthio, alkylthioarylthio, arylthioarylthio, alkanoylthio, aryloylthio, alkoxycarbonylthio, aryloxycarbonylthio, vinyloxycarbonylthio, alkenyloxycarbonylthio, allyloxycarbonylthio, benzyloxycarbonylthio, arylalkyloxycarbonylthio, mercapto, mercaptoalkylthio, mercaptoarylalkylthio, mercaptoarylthio, mercaptoalkylarylthio, mercaptoalkylarylalkylthio, or mercaptoarylalkylarylthio, wherein permissible substituents are one or more aromatic or heteroaromatic or heteroalicyclic or alicyclic ring, alkyl, aryl, alkenyl, alkynyl, alkylene, arylene, alkenylene, alkynylene, halo, nitro, amino, alkylamino, dialkylamino, arylamino, diarylamino, alkylarylamino, cyano, hydroxyl, alkanoylthio, aryloylthio, alkoxycarbonylthio, aryloxycarbonylthio, alkylthio, arylthio, arylcarbonylthio, mercapto, epoxy moiety, or other permissible $R_9$ substituent, or acid functional group such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters; or any two $R_{10}$ groups together, or any $R_{10}$ group together with any $R_4$, or $R_7$group may form a substituted or unsubstituted alkylene, alkenylene or alkynylene chain, which chain may optionally include one or more divalent atoms or moieties, such as nitrogen, sulfur, sulfinyl, ester, carbonyl, sulfonyl, selenium, tellurium, phosphorus or oxygen, wherein permissible substituents are one or more aromatic or heteroaromatic or heteroalicyclic or alicyclic ring, alkyl, aryl, alkenyl, alkynyl, alkylene, arylene, alkenylene, alkynylene, halo, nitro, amino, alkylamino, dialkylamino, arylamino, diarylamino, alkylarylamino, cyano, hydroxyl, alkanoylthio, aryloylthio, alkoxycarbonylthio, aryloxycarbonylthio, alkylthio, arylthio, arylcarbonylthio, mercapto, epoxy moiety, or other permissible $R_9$ substituent, or acid functional group such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters.

2. A functionalized polyaniline comprises of the Formulas XVII to XX,

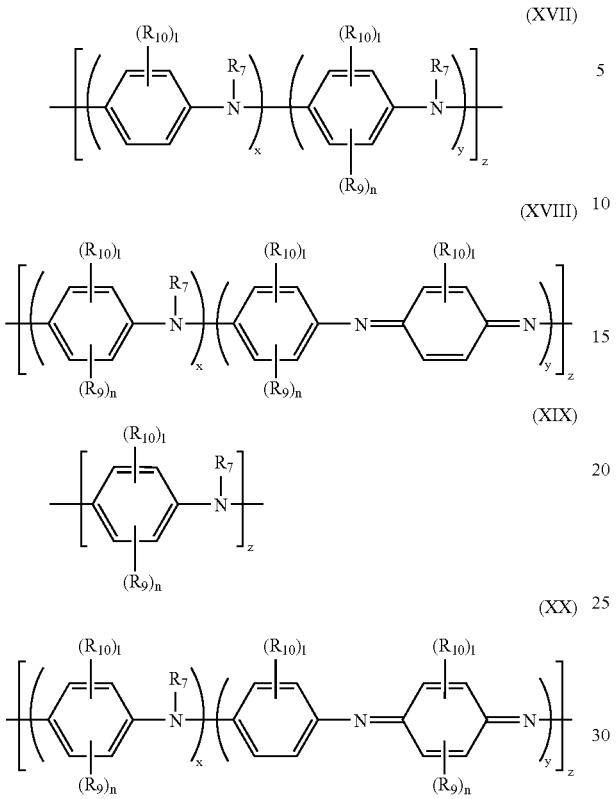

wherein:
- x and y are the same or different at each occurrence and are integers equal to or greater than 0, with the proviso that the sum of x and y is greater than 0; and
- z is the same or different at each occurrence and is an integer equal to or greater than 1,
- n is the same or different at each occurrence and is an integer from 0 to about 4;
- l is the same or different at each occurrence and is an integer from 0 to 4, with the proviso that at least one occurring l is not zero and with the further proviso that the sum of n and l at the same occurring repeat unit is equal to or less than 4;
- $R_9$ is the same or different at each occurrence and is selected from the group consisting of hydrogen, deuterium, alkyl, alkenyl, alkynyl, alkenynyl, aryl, alkylaryl, arylalkyl, allyl, benzyl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkylthio, alkylthioarylthio, arylthioarylthio, alkanoylthio, aryloylthio, alkoxycarbonylthio, aryloxycarbonylthio, aryloxycarbonylthio, vinyloxycarbonylthio, alkenyloxycarbonylthio, allyloxycarbonylthio, benzyloxycarbonylthio, arylalkyloxycarbonylthio, alkylcarboxylthioalkoxy, arylcarboxylthioalkoxy, alkylcarbonylthioaryloxy, arylcarbonylthioaryloxy, alkoxycarboxylthioalkoxy, aryloxycarboxylthioalkoxy, alkyloxycarbonylthioaryloxy, aryloxycarbonylthioaryloxy, halo, hydroxyl, hydroxyalkyl, hydroxyaryl, cyano, nitro, alkylsilane, arylsilane, amino, aminoalkyl, aminoaryl, amido, amidoalkyl, amidoaryl, arylamino, diarylamino, alkylamino, dialkylamino, alkylarylamino, cycloalkylamino, alkyleneamino, alkylphosphine, dialkylphosphine, arylphosphine, diarylphosphine, alkylarylphosine, cycloalkylphosphine, alkylenephosphine, alkoxyalkyl, aryloxyalkyl, alkoxycarbonyl, aryloxycarbonyl, vinyloxycarbonyl, alkenyloxycarbonyl, allyloxycarbonyl, benzyloxycarbonyl, arylalkyloxycarbonyl, aryloxycarbonyloxy, alkoxycarbonyloxy, aryloxycarbonyloxy, heterocyclic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate, acid functional groups such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters; or any of the foregoing aromatic or heteroaromatic or aliphatic or cycloaliphatic groups substituted with one or more acid functional groups such as sulfonic acid, carboxylic acid, phosphonic acid, phosphoric acid, phosphinic acid, sulfinic acid, and the derivatives thereof, such as salts, esters; or any of the foregoing aromatic or heteroaromatic or aliphatic or cycloaliphatic groups substituted with one or more the functional groups selected from the group consisting of heterocyclic ring, heteroaromatic ring, alkyl, cycloalkyl, aryl, alkenyl, alkynyl, alkylene, arylene, alkenylene, alkynylene, alkoxy, aryloxy, alkanoyloxy, aryloyloxy, arylamino, diarylamino, alkylamino, dialkylamino, alkylarylamino, halo, amino, nitro, hydroxyl, cyano, hydroxyl, alkanoylthio, aryloylthio, alkoxycarbonylthio, aryloxycarbonylthio, alkylthio, arylthio, arylcarbonylthio, mercapto, epoxy moiety, or other permissible $R_9$ substituent; or any two $R_9$ groups together, or any $R_9$ group together with any $R_7$ group may form a substituted or unsubstituted alkylene or alkenylene or alkynylene chain completing a 3, 4, 5, 6, 7, 8, 9 or 10 membered aromatic or heteroaromatic or heteroalicyclic or alicyclic ring, which ring may optionally include one or more divalent nitrogen, sulfur, sulfinyl, ester, carbonyl, sulfonyl, selenium, tellurium, phosphorus or oxygen, wherein permissible substituents are one or more aromatic, heteroaromatic, heteroalicyclic or alicyclic ring, alkyl, aryl, alkenyl, alkynyl, alkylene, arylene, alkenylene, alkynylene, halo, nitro, amino, alkylamino, dialkylamino, arylamino, diarylamino, alkylarylamino, cyano, hydroxyl, alkanoylthio, aryloylthio, alkoxycarbonylthio, aryloxycarbonylthio, alkylthio, arylthio, arylcarbonylthio, mercapto, epoxy moiety, or other permissible $R_9$ substituent, or acid functional group such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters; and
- $R_7$ is the same or different at each occurrence and is selected from a group consisting of permissible $R_9$ group; and
- $R_{10}$ is the same or different at each occurrence and is selected from hydrogen, or the functional groups consisting of substituted or unsubstituted alkylamino, arylamino, dialkylamino, diarylamino, alkylarylamino, cycloalkylamino, alkyleneamino, alkylphosphine, dialkylphosphine, arylphosphine, diarylphosphine, alkylarylphosine, cycloalkylphosphine, alkylenephosphine, alkylthio, arylthio, alkylthioalkylthio, alkylthioarylthio, arylthioarylthio, alkanoylthio, aryloylthio, alkoxycarbonylthio, aryloxycarbonylthio, vinyloxycarbonylthio, alkenyloxycarbonylthio, allyloxycarbonylthio, benzyloxycarbonylthio, arylalkyloxycarbonylthio, mercapto, mercaptoalkylthio, mercaptoarylalkylthio, mercaptoarylthio, mercaptoalkylarylthio, mercaptoalkylarylalkylthio, or mercaptoarylalkylarylthio, wherein permissible substituents are one or more aromatic or heteroaromatic or heteroalicyclic or alicyclic ring, alkyl, aryl, alkenyl, alkynyl, alkylene, arylene, alkenylene, alkynylene, halo, nitro, amino, alkylamino, dialkylamino, arylamino, diarylamino, alkylarylamino, cyano, hydroxyl, alkanoylthio, aryloylthio, alkoxycarbonylthio, aryloxycarbonylthio, alkylthio, arylthio, mercapto, epoxy moiety, or other permissible $R_9$ substituent, or acid functional group such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters; or any two $R_{10}$ groups together, or any $R_{10}$ group together with any $R_9$ or $R_7$ group may form a substituted or unsubstituted alkylene, alkenylene or alkynylene chain, which chain may optionally include one or more divalent atoms or moieties, such as nitrogen, sulfur, sulfinyl, ester, carbonyl, sulfonyl, selenium, tellurium, phosphorus or oxygen, wherein permissible substituents are one or more aromatic or heteroaromatic or heteroalicyclic or alicyclic ring, alkyl, aryl, alkenyl, alkynyl, alkylene, arylene, alkenylene, alkynylene, halo, nitro, amino, alkylamino, dialkylamino, arylamino, diarylamino, alkylarylamino, cyano, hydroxyl, alkanoylthio, aryloylthio, alkoxycarbonylthio, aryloxycarbonylthio, alkythio, arylthio, mercapto, epoxy moiety, or other permissible $R_9$ substituent, or acid functional group such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters.

3. A functionalized polyaniline according to claim 2, wherein:
$R_{10}$ is the same or different at each occurrence and is selected from hydrogen, or the functional groups consisting of substituted or unsubstituted alkylthio, arylthio, alkylthioalkylthio, alkylthioarylthio, arylthioarylthio, alkanoylthio, aryloylthio, alkoxycarbonylthio, aryloxycarbonylthio, vinyloxycarbonylthio, alkenyloxycarbonylthio, allyloxycarbonylthio, benzyloxycarbonylthio, arylalkyloxycarbonylthio, mercapto, mercaptoalkylthio, mercaptoarylalkylthio, mercaptoarylthio, mercaptoalkylarylthio, mercaptoalkylarylalkylthio, or mercaptoarylalkylarylthio, wherein permissible substituents are one or more aromatic or heteroaromatic or heteroalicyclic or alicyclic ring, alkyl, aryl, alkenyl, alkynyl, alkylene, arylene, alkenylene, alkynylene, halo, nitro, amino, alkylamino, dialkylamino, arylamino, diarylamino, alkylarylamino, cyano, hydroxyl, alkanoylthio, aryloylthio, alkoxycarbonylthio, aryloxycarbonylthio, alkylthio, arylthio, arylcarbonylthio, mercapto, epoxy moiety, or other permissible $R_9$ substituent, or acid functional group such as phosphonic acid, phosphinic acid, boric acid, carboxylic acid, sulfinic acid, sulfonic acid, phospho-nate salts, phosphinate salts, borate salts, carboxylate salts, sulfinate salts, sulfonate salts, phosphoric acid, phosphate salts, and the derivatives thereof, such as esters; or any two $R_{10}$ groups together, or any $R_{10}$ group together with any $R_9$ or $R_7$ group may form a substituted or unsubstituted alkylene, alkenylene or alkynylene chain, which chain may optionally include one or more divalent atoms or moieties, such as nitrogen, sulfur, sulfinyl, ester, carbonyl, sulfonyl, selenium, tellurium, phosphorus or oxygen, wherein permissible substituents are one or more aromatic or heteroaromatic or heteroalicyclic or alicyclic ring, alkyl, aryl, alkenyl, alkynyl, alkylene, arylene, alkenylene, alkynylene, halo, nitro, amino, alkylamino, dialkylamino, arylamino, diarylamino, alkylarylamino, cyano, hydroxyl, alkanoylthio, aryloylthio, alkoxycarbonylthio, aryloxycarbonylthio, alkylthio, arylthio, arylcarbonylthio, mercapto, epoxy moiety, or other permissible $R_9$ substituent, or acid functional group such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters.

4. A functionalized polyaniline according to claim 3, wherein:
$R_{10}$ is the same or different at each occurrence and is selected from hydrogen, or the functional groups consisting of substituted or unsubstituted alkythio, arylthio, alkylthioalkylthio, alkylthioarylthio, arylthioarylthio, alkanoylthio, aryloylthio, alkoxycarbonylthio, aryloxycarbonylthio, vinyloxycarbonylthio, alkenyloxycarbonylthio, allyloxycarbonylthio, benzyloxycarbonylthio, arylalkyloxycarbonylthio, mercapto, mercaptoalkylthio, mercaptoarylalkylthio, mercaptoarylthio, mercaptoalkylarylthio, mercaptoalkylarylalkylthio, or mercaptoarylalkylarylthio, wherein permissible substituents are one or more aromatic or heteroaromatic or heteroalicyclic or alicyclic ring, alkyl, aryl, alkenyl, alkynyl, alkylene, arylene, alkenylene, alkynylene, halo, nitro, amino, alkylamino, dialkylamino, arylamino, diarylamino, alkylarylamino, cyano, hydroxyl, alkanoylthio, aryloylthio, alkoxycarbonylthio, aryloxycarbonylthio, alkylthio, arylthio, arylcarbonylthio, mercapto, epoxy moiety, or other permissible $R_9$ substituent, or acid functional group such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters.

5. A functionalized polyaniline according to claim 4, wherein:
$R_{10}$ is the same or different at each occurrence and is selected from hydrogen, or the functional groups consisting of substituted or unsubstituted alkylthio, arylthio, alkylthioalkylthio, alkylthioarylthio, arylthioarylthio, alkanoylthio, aryloylthio, alkoxycarbonylthio, aryloxycarbonylthio, vinyloxycarbonylthio, alkenyloxycarbonylthio, allyloxycarbonylthio, benzyloxycarbonylthio, arylalkyloxycarbonylthio, mercapto, mercaptoalkylthio, mercaptoarylalkylthio, mercaptoarylthio, mercaptoalkylarylthio, mercaptoalkylarylalkylthio, or mercaptoarylalkylarylthio, wherein permissible substituents are one or more acid functional group such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters.

6. A functionalized polyaniline according to claim 4, wherein:

$R_{10}$ is the same or different at each occurrence and is selected from hydrogen, or the functional groups consisting of substituted or unsubstituted alkylthio, arylthio, alkylthioalkylthio, alkylthioarylthio, arylthioarylthio, alkanoylthio, aryloylthio, alkoxycarbonylthio, aryloxycarbonylthio, vinyloxycarbonylthio, alkenyloxycarbonylthio, allyloxycarbonylthio, benzyloxycarbonylthio, arylalkyloxycarbonylthio, mercapto, mercaptoalkylthio, mercaptoarylalkylthio, mercaptoarylthio, mercaptoalkylarylthio, mercaptoalkylarylalkylthio, or mercaptoarylalkylarylthio, wherein permissible substituents are one or more amino, alkylamino, dialkylamino, arylamino, diarylamino, alkylarylamino, cyano, hydroxyl, or epoxy moiety.

7. A functionalized polyaniline according to claim 4, wherein:

$R_{10}$ is the same or different at each occurrence and is selected from hydrogen, or the functional groups consisting of substituted or unsubstituted alkylthio, arylthio, alkylthioalkylthio, alkylthioarylthio, arylthioarylthio, alkanoylthio, aryloylthio, alkoxycarbonylthio, aryloxycarbonylthio, vinyloxycarbonylthio, alkenyloxycarbonylthio, allyloxycarbonylthio, benzyloxycarbonylthio, arylalkyloxycarbonylthio, mercapto, mercaptoalkylthio, mercaptoarylalkylthio, mercaptoarylthio, mercaptoalkylarylthio, mercaptoalkylarylalkylthio, or mercaptoarylalkylarylthio, wherein permissible substituents are one or more aromatic or heteroaromatic or heteroalicyclic or alicyclic ring.

8. A functionalized polyaniline according to claim 4, wherein:

$R_{10}$ is the same or different at each occurrence and is selected from hydrogen, or the functional groups consisting of substituted or unsubstituted alkylthio, arylthio, alkylthioalkylthio, alkylthioarylthio, arylthioarylthio, alkanoylthio, aryloylthio, alkoxycarbonylthio, aryloxycarbonylthio, vinyloxycarbonylthio, alkenyloxycarbonylthio, allyloxycarbonylthio, benzyloxycarbonylthio, arylalkyloxycarbonylthio, mercapto, mercaptoalkylthio, mercaptoarylalkylthio, mercaptoarylthio, mercaptoalkylarylthio, mercaptoalkylarylalkylthio, or mercaptoarylalkylarylthio, wherein permissible substituents are one or more alkanoylthio, aryloylthio, alkoxycarbonylthio, aryloxycarbonylthio, alkylthio, arylthio, arylcarbonylthio, mercapto.

9. A functionalized polyaniline made from a method comprising the steps of:

(a) providing polyaniline in a solid state form;
(b) subjecting said solid state polyaniline to a redox treatment to convert backbone of said solid state polyaniline into a specified oxidation state; and
(c) subjecting said solid state polyaniline in an oxidation state to a reaction treatment with a solution of reactive chemical reagent(s) in a selected solvent(s) for a period of time, said solvent(s) is capable of dissolving or dispersing said chemical reagent(s) and swelling or wetting said solid state polyaniline, and said chemical reagent(s) is capable of functionalizing said solid state polyaniline and transforming the backbone of said solid state polyaniline into a more reduced form.

10. A functionalized polyaniline according to claim 9, wherein said polyaniline comprises repeat units of the Formulas IX and X:

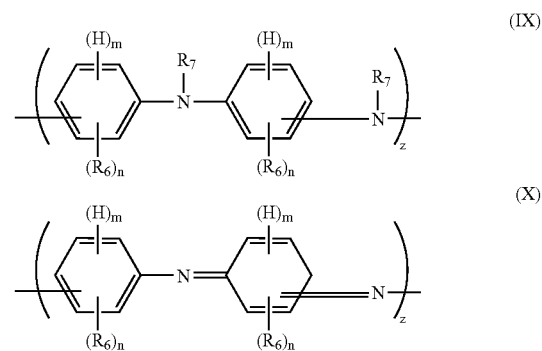

wherein:

n is an integer from 0 to about 3;

m is an integer from 1 to 4, with the proviso that the sum of n and m is equal to 4;

$R_6$ is the same or different at each occurrence and is selected from the group consisting of deuterium, alkyl, alkenyl, alkynyl, alkenynyl, aryl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, alkylaryl, arylalkyl, halo, hydroxyl, cyano, nitro, alkylsilane, amino, amido, arylamino, diarylamino, alkylamino, dialkylamino, alkylarylamino, alkoxyalkyl, aryloxyalkyl, alkoxycarbonyl, heterocyclic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate, acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters; any aromatic, heteroaromatic, aliphatic, cycloaliphatic groups substituted with at least one acid functional group, such as sulfonic acid, carboxylic acid, phosphonic acid, phosphoric acid, phosphinic acid, sulfinic acid, and the derivatives thereof, such as salts and esters; any of the aromatic, heteroaromatic, aliphatic, cycloaliphatic groups substituted with at least one the functional group selected from the group consisting of heterocyclic ring, heteroaromatic ring, alkoxy, aryloxy, alkanoyloxy, aryloyloxy, alkylthio, arylthio, arylamino, diarylamino, alkylamino, dialkylamino, alkylarylamino, halo, amino, nitro, hydroxyl, mercapto, cyano, and epoxy moieties; any two $R_6$ groups together, any $R_6$ group together with any $R_7$ group forming a substituted or unsubstituted alkylene, alkenylene, alkynylene chain completing a 3, 4, 5, 6, 7, 8, 9, 10 membered aromatic, heteroaromatic, heteroalicyclic, alicyclic ring, which ring may optionally include at least one divalent nitrogen, sulfur, sulfinyl, ester, carbonyl, sulfonyl, oxygen atom wherein permissible substituents are at least one halo, nitro, amino, alkylamino, dialkylamino, arylamino, diarylamino, alkylarylamino, cyano, epoxy moieties, acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters; and $R_7$ is the same or different at each occurrence and is selected from a group consisting of permissible $R_6$ subsitutent and hydrogen; and z is an integer equal to greater than 1.

11. A functionalized polyaniline according to claim 9, wherein said polyaniline is comprised of the Formulas XI and XIV:

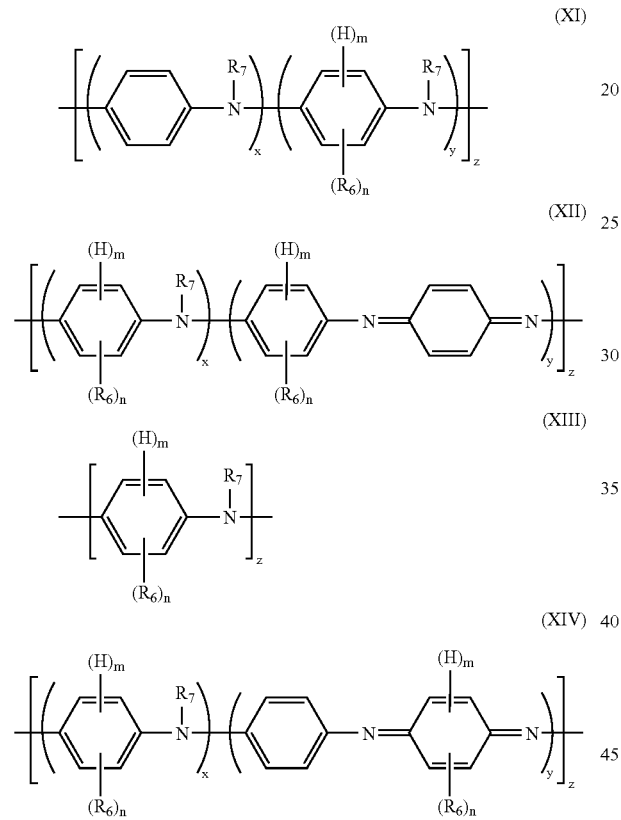

wherein:
  n is an integer from 0 to about 3;
  m is an integer from 1 to 4, with the proviso that the sum of n and m is equal to 4;
  $R_6$ is the same or different at each occurrence and is selected from the group consisting of deuterium, alkyl, alkenyl, alkynyl, alkenynyl, aryl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, alkylaryl, arylalkyl, halo, hydroxyl, cyano, nitro, alkylsilane, amino, amido, arylamino, diarylamino, alkylamino, dialkylamino, alkylarylamino, alkoxyalkyl, aryloxyalkyl, alkoxycarbonyl, heterocyclic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate, acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters; any of the aromatic, heteroaromatic, aliphatic, cycloaliphatic groups substituted with at least one acid functional groups, such as sulfonic acid, carboxylic acid, phosphonic acid, phosphoric acid, phosphinic acid, sulfinic acid, and the derivatives thereof, such as salts, esters; any of the aromatic, heteroaromatic, aliphatic, cycloaliphatic groups substituted with at least one functional groups selected from the group consisting of heterocyclic ring, heteroaromatic ring, alkoxy, aryloxy, alkanoyloxy, aryloyloxy, alkylthio, arylthio, arylamino, diarylamino, alkylamino, dialkylamino, alkylarylamino, halo, amino, nitro, hydroxyl, mercapto, cyano, epoxy moieties; any two $R_6$ groups together, any $R_6$ group together with any $R_7$ group forming a substituted or unsubstituted alkylene, alkenylene, alkynylene chain completing a 3, 4, 5, 6, 7, 8, 9, 10 membered aromatic, heteroaromatic, heteroalicyclic, alicyclic ring, which ring may optionally include at least one divalent nitrogen, sulfur, sulfinyl, ester, carbonyl, sulfonyl, oxygen atoms wherein permissible substituents are at least one halo, nitro, amino, alkylamino, dialkylamino, arylamino, diarylamino, alkylarylamino, cyano, epoxy moieties, acid functional group such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters; and $R_7$ is the same or different at each occurrence and is selected from a group consisting of permissible $R_6$ subsitutent or hydrogen;

x and y are integers equal to or greater than 0, where the sum of x and y is greater than 0; and z is an integer equal to or greater than 1.

12. A functionalized polyaniline according to claim 9, wherein said polyanilines in step (a) are made from a mixture comprising of one or more aniline monomer(s) of Formula VIII:
wherein:
  n is an integer from 0 to 5;
  m is an integer from 0 to 5, with the proviso that the sum of n and m is equal to 5 and with the further proviso that at least one position on the aniline ring,
  $R_6$ is selected from the group consisting of deuterium, alkyl, alkenyl, alkynyl, alkenynyl, aryl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, alkylaryl, arylalkyl, halo, hydroxyl, cyano, nitro, alkylsilane, amino, amido, arylamino, diarylamino, alkylamino, dialkylamino, alkylarylamino, alkoxyalkyl, aryloxyalkyl, alkoxycarbonyl, heterocyclic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate, acid functional group, such as phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters; any of the aromatic, heteroaromatic, aliphatic, cycloaliphatic groups substituted with at least one acid functional groups, such as sulfonic acid, carboxylic acid, phosphonic acid, phosphoric acid, phosphinic acid, sulfinic acid, and the derivative; thereof, such as salts, esters; any of the aromatic, heteroaromatic, aliphatic, cycloaliphatic groups substituted with at least one functional groups selected from the group consisting of heterocyclic ring, heteroaromatic ring, alkoxy, aryloxy, alkanoyloxy, aryloyloxy, alkylthio, arylthio, arylamino, diarylamino, alkylamino, dialkylamino, alkylarylamino, halo, amino, nitro, hydroxyl, mercapto, cyano, epoxy

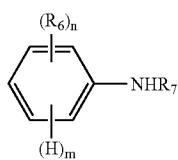

(VIII)

moieties; any two $R_6$ groups together, any $R_6$ group together with any $R_7$ group forming a substituted or unsubstituted alkylene, alkenylene, alkynylene chain completing a 3, 4, 5, 6, 7, 8, 9, 10 membered aromatic, heteroaromatic, heteroalicyclic, alicyclic ring, which ring may optionally include at least one divalent nitrogen, sulfur, sulfinyl, ester, carbonyl, sulfonyl, oxygen atoms wherein permissible substituents are at least halo, nitro, amino, alkylamino, dialkylamino, arylamino, diarylamino, alkylarylamino, cyano, epoxy moieties, acid functional group, such us phosphonic acid, phosphinic acid, boric acid, carboxylic acid, sulfinic acid, sulfonic acid, phosphonate salts, phosphinate salts, borate salts, carboxylate salts, sulfinate salts, sulfonate salts, phosphoric acid, phosphate salts, and the derivatives thereof, such as esters; $R_6$ is an aliphatic moiety having repeat units of the formula:

$$-(OCH_2CH_2)_qOCH_3, -(OCH_2CH(CH_3))_qOCH_3,$$
$$-(CH_2)_qCF_3, -(CF_2)_qCF_3, -(CH_2)_qCH_3$$

wherein q is a positive whole number; and $R_7$ is selected from a group consisting of permissible $R_6$ subsituent and hydrogen.

13. A functionalized polyaniline according to claim 9, wherein the reactive chemical reagent(s) in step (c) is selected from the a group consisting of the formulas II to IV:

$$R_1SH \quad (II)$$

$$R_1R_2NH \quad (III)$$

$$R_1R_2PH \quad (IV)$$

wherein:

$R_1$, $R_2$ and $R_3$ are the same or different at each occurrence and are selected from the group consisting of hydrogen and isotopes thereof, alkyl, alkenyl, alkynyl, alkenynyl, aryl, alkylaryl, arylalkyl, allyl, benzyl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, mercaptoalkoxy, mercaptoaryloxy, mercaptoalkyl, mercaptoaryl, mercaptoarylthio, mercaptoalkylthio, mercaptoalkylarylalkyl, mercaptoaryl alkylaryl, halo, hydroxyl, hydroxyalkyl, hydroxyaryl, cyano, alkylsilane, amino, aminoalkyl, aminoaryl, amido, amidoalkyl, amidoaryl, arylamino, diarylamino, alkylamino, dialkylamino, alkylarylamino, alkoxyalkyl, aryloxyalkyl, alkoxycarbonyl, alkoxysilylalkyl, alkylsilylalkyl, alkoxysilylaryl, alkylsilylaryt, heterocyclic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate, any of the aromatic, heteroaromatic, aliphatic, cycloaliphatic groups substituted with at least one acid functional groups, such as sulfonic acid, carboxylic acid, phosphonic acid, phosphoric acid, phosphinic acid, sulfinic acid, and the derivatives thereof, such as salts, esters; any of the aromatic, heteroaromatic, aliphatic, cycloaliphatic groups substituted with at least functional groups selected from the group consisting of heterocyclic ring, heteroaromatic ring, alkyl, aryl, allyl, benzyl, alkoxy, aryloxy, alkanoyloxy, aryloyloxy, alkylthio, arylthio, mercaptoalkoxy, mercaptoaryloxy, mercaptoalkyl, mercaptoaryl, mercaptoarylthio, mercaptoalkylthio, mercaptoalkylarylalkyl, mercaptoaryl, arylamino, diarylamino, alkylamino, dialkylamino, alkylarylamino, halo, nitro, hydroxyl, hydroxyalkyl, hydroxyaryl, alkylsilane, alkoxysilane, amino, aminoalkyl, aminoaryl, amido, amidoalkyl, amidoaryl, mercapto, cyano, epoxy moieties, permissible $R_1$, $R_2$, $R_3$ groups; derivatives of a moiety of the formula:

$$(OR_4)_rOR_5$$

wherein:

$R_4$ is a divalent alkylene moiety having from 1 to about 7 carbon atoms;

$R_5$ is alkyl having from 1 to about 20 carbon atoms; and r is a natural number from 1 to about 50;

$R_2$ and $R_3$ substituents taken together may form a substituted or unsubstituted alkylene, alkenylene, alkynylene chain completing a 3, 4, 5, 6, 7, 8, 9, 10 membered aromatic, heteroaromatic, heteroalicyclic, alicyclic ring, the ring including at least one degree of unsaturation, at least one heteroatoms of nitrogen, sulfur, sulfinyl, sulfonyl, phosphorus, selenium, ester, carbonyl, oxygen atoms, at least one substituent groups selected from permissible $R_1$, $R_2$, $R_3$ substituents.

14. A functionalized polyaniline according to claim 9, wherein the reactive chemical reagent in step (c) is of the formulas II:

$$R_1SH \quad (II)$$

wherein:

$R_1$ is selected from the group consisting of hydrogen or isotopes thereof, alkyl, alkenyl, alkynyl, alkenynyl, aryl, alkylaryl, arylalkyl, allyl, benzyl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, mercaptoalkoxy, mercaptoaryloxy, mercaptoalkyl, mercaptoaryl, mercaptoarylthio, mercaptoalkylthio, mercaptoalkylarylalkyl, mercaptoaryl alkylaryl, halo, hydroxyl, hydroxyalkyl, hydroxyaryl, cyano, alkylsilane, amino, aminoalkyl, aminoaryl, amido, amidoalkyl, amidoaryl, arylamino, diarylamino, alkylamino, dialkylamino, alkylarylamino, alkoxyalkyl, aryloxyalkyl, alkoxycarbonyl, alkoxysilylalkyl, alkylsilylalkyl, alkoxysilylaryl, alkylsilylaryl, heterocyclic ring, heteroaromatic ring, alkylsulfinyl, arylsulfinyl, alkylsulfonyl, arylsulfonyl, alkylsulfinylalkyl, alkylsulfonylalkyl, alkydcarboxylate, alkylsulfinate, alkylsulfonate, alkylphosphonate, any of the aromatic, heteroaromatic, aliphatic, cycloaliphatic groups substituted with at least one acid functional group, such as sulfonic acid, carboxylic acid, phosphonic acid, phosphoric acid, phosphinic acid, sulfinic acid, and the derivatives thereof, such as salts and esters; any of the aromatic, heteroaromatic, aliphatic, cycloaliphatic groups substituted with at least one functional group selected from the group consisting of heterocyclic ring, heteroaromatic ring, alkyl, aryl, allyl, benzyl, alkoxy, aryloxy, alkanoyloxy, aryloyloxy, alkylthio, arylthio, mercaptoalkoxy, mercaptoaryloxy, mercaptoalkyl, mercaptoaryl, mercaptoarylthio, mercaptoalkylthio, mercaptoalkylarylalkyl, mercaptoaryl, arylamino, diarylamino, alkylamino, dialkylamino, alkylarylamino, halo, nitro, hydroxyl, hydroxyalkyl, hydroxyaryl, alkylsilane, alkoxysilane, amino, aminoalkyl, aminoaryl, amido, amidoalkyl, amidoaryl, mercapto, cyano, epoxy moieties, permissible $R_1$ groups; derivatives of a moiety of the formula:

(OR$_4$),OR$_5$ wherein:

$R_4$ is a divalent alkylene moiety having from 1 to about 7 carbon atoms;

$R_5$ is alkyl having from 1 to about 20 carbon atoms; and
r is a natural number from 1 to about 50.

15. A functionalized polyaniline made from a method comprising the steps of:
 (a) providing polyaniline in a solid state form; and
 (b) subjecting said solid state polyaniline in an oxidation state to a reaction treatment with a solution of reactive chemical reagent(s) in a selected solvent(s) for a period of time, said solvent(s) is capable of dissolving or dispersing said chemical reagent(s) and swelling or wetting said solid state polyaniline, and said chemical reagent(s) is capable of functionalizing said solid state polyaniline and transforming the backbone of said solid state polyaniline into a more reduced form.

16. A functionalized polyaniline according to claim 15, wherein said method, after step (a), further comprises the step of:
 (a') subjecting said solid state polyaniline to a redox treatment to convert backbone of said solid state polyaniline into a specified oxidation state.

17. A functionalized polyaniline according to claim 9, wherein the redox treatment is carried out by air.

18. A functionalized polyaniline according to claim 9, wherein steps (b) and/or (c) are repeated in at least one treatment cycle.

19. A functionalized polyaniline according to claim 18, wherein the reactive chemical reagent in each redox/reaction treatment cycle is the same.

20. A functionalized polyaniline according to claim 9, wherein the reaction treatment employs at least one reactive chemical reagent in each repeat cycle.

21. A functionalized polyaniline according to claim 9, wherein the reactive chemical reagent in each redox/reaction treatment cycle is different.

22. A functionalized polyaniline according to claim 9, wherein the reaction treatment with reactive chemical reagent in step (c) is carried out by an oxidizing atmosphere selected from the group consisting of air and $O_2$.

23. A functionalized polyaniline according to claim 22, wherein the reaction treatment is performed for a time period sufficient to convert the resultant polyaniline to an oxidation state equal to or higher than the oxidation state of said solid state polyaniline.

* * * * *